(12) United States Patent
Ou

(10) Patent No.: US 9,900,787 B2
(45) Date of Patent: Feb. 20, 2018

(54) MULTICOMPUTER DATA TRANSFERRING SYSTEM WITH A BASE STATION

(71) Applicant: George Ou, Sunnyvale, CA (US)

(72) Inventor: George Ou, Sunnyvale, CA (US)

(73) Assignee: George Ou, Sunnyvale, CA (US)

( * ) Notice: Subject to any disclaimer, the term of this patent is extended or adjusted under 35 U.S.C. 154(b) by 0 days.

(21) Appl. No.: 15/280,472

(22) Filed: Sep. 29, 2016

(65) Prior Publication Data

US 2017/0094532 A1   Mar. 30, 2017

Related U.S. Application Data

(60) Provisional application No. 62/235,047, filed on Sep. 30, 2015.

(51) Int. Cl.
| | |
|---|---|
| *H01Q 3/20* | (2006.01) |
| *H01Q 21/24* | (2006.01) |
| *H04W 64/00* | (2009.01) |
| *H04W 16/28* | (2009.01) |
| *H01Q 1/24* | (2006.01) |
| *H01Q 3/04* | (2006.01) |
| *H01Q 15/16* | (2006.01) |
| *H04W 88/08* | (2009.01) |

(52) U.S. Cl.
CPC ............ *H04W 16/28* (2013.01); *H01Q 1/246* (2013.01); *H01Q 3/04* (2013.01); *H01Q 15/16* (2013.01); *H04W 88/08* (2013.01)

(58) Field of Classification Search
CPC ............ H01Q 1/246; H01Q 3/02; H01Q 3/04; H01Q 15/16; H01Q 3/00; H01Q 3/12; H01Q 3/20; H01Q 21/24; H04W 16/28; H04W 64/00; H04W 64/003
See application file for complete search history.

(56) References Cited

U.S. PATENT DOCUMENTS

| | | | |
|---|---|---|---|
| 7,019,703 B2* | 3/2006 | Webb .................. | H01Q 3/20 343/700 MS |
| 2005/0113138 A1* | 5/2005 | Mendolia ............... | G01S 5/04 455/558 |

(Continued)

*Primary Examiner* — Blane Jackson
(74) *Attorney, Agent, or Firm* — Hickman Palermo Becker Bingham LLP

(57) ABSTRACT

In an embodiment, a data transferring system comprises a rotating base station computer with a rotatable reflector, an antenna, and a transmitter, and is configured: as the rotatable reflector rotates around the antenna which remains static when the rotatable reflector rotates, periodically transmitting a plurality of base broadcast wireless communications from the transmitter; in response to transmitting the plurality of base broadcast wireless communications, receiving a plurality of tag response wireless communications from a particular tag computer, from one or more tag computers; in response to receiving the plurality of tag response wireless communications: determining a plurality of signal strength values associated with the plurality of tag response wireless communications; based on, at least in part, the plurality of signal strength values, determining a tag magnetic heading of the particular tag computer that indicates a relative location of the particular tag computer with respect to the rotating base station computer.

20 Claims, 11 Drawing Sheets

(56) References Cited

U.S. PATENT DOCUMENTS

| | | | |
|---|---|---|---|
| 2010/0231410 A1* | 9/2010 | Seisenberger | G01S 13/74 340/8.1 |
| 2012/0248187 A1* | 10/2012 | Piazza | H01Q 3/00 235/439 |
| 2013/0113669 A1* | 5/2013 | Bellows | H01Q 1/2216 343/764 |
| 2016/0072185 A1* | 3/2016 | Lanciault | H01Q 3/20 343/761 |

* cited by examiner

MULTICOMPUTER DATA TRANSFERRING SYSTEM WITH A BASE STATION

BENEFIT CLAIM

This application claims the benefit under 35 U.S.C. 119 of U.S. provisional application 62/235,047, filed Sep. 30, 2015, the entire contents of which are hereby incorporated by reference for all purposes as fully set forth herein.

TECHNICAL FIELD

The present disclosure generally relates to a multicomputer data transferring system with one or more rotating base stations for generating and transmitting electronic data for an automatic object detection. SUGGESTED GROUP ART UNIT: 2447; SUGGESTED CLASSIFICATION: 709.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Information about physical locations of radio-enabled computing devices, such as smartphones, tablets, and laptops, may be obtained using satellite-based Global Positioning Systems (GPS). However, GPS systems do not work reliably indoors because a weak satellite signal is often unable to penetrate the building's structures. Even where a GPS signal is detectable, accuracy of the location information may be insufficient for applications such as a drone-collision avoidance or a camera-based tracking. Furthermore, it is often difficult to implement the GPS receivers as wearable devices because they are often large in size and require relatively large antennas for establishing communications with satellites providing GPS signals.

Existing indoor positioning systems are often large in size and expensive to implement because they rely on proprietary radio systems and infrared sensors. Some positioning systems configured to determine a position of an object rely on a trilateration, which requires at least three dispersed base stations configured to compute the position information of the object.

Some solutions may require transmitting a large quantity of Bluetooth Low Energy (BLE) beacons every few meters. In some situations, hundreds of the BLE beacons are necessary to cover even a moderate size area. Furthermore, existing indoor positioning systems may require a frequent maintenance, including replacing the batteries, and so forth. Some of the existing positioning solutions lack a signal authentication. That drawback poses serious risks in security-conscious applications, such as navigation systems.

SUMMARY

The appended claims may serve as a summary of the disclosed approach.

Figure 1:
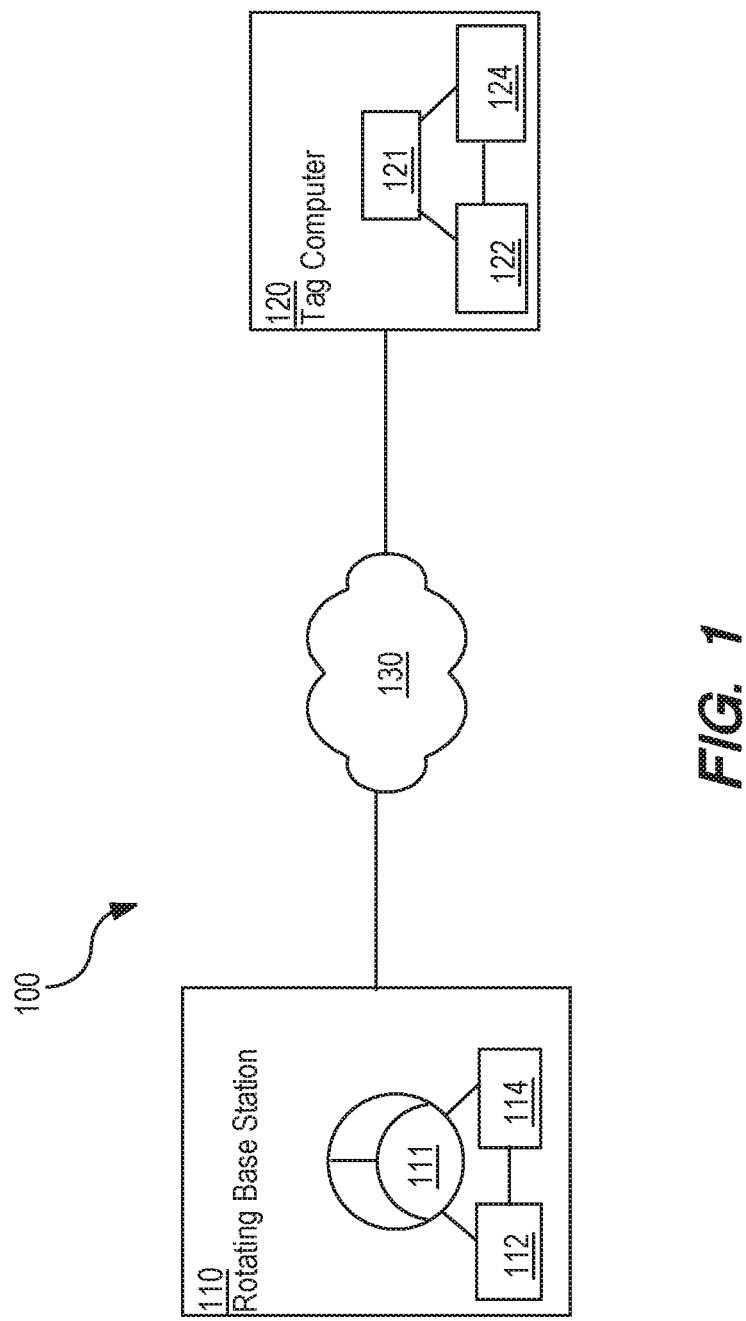
FIG. 1 depicts an example multicomputer data transferring system with one or more rotating base stations and one or more tag computers according to an example embodiment.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Furthermore, words, such as "or," may be inclusive or exclusive unless expressly stated otherwise.

Embodiments are described herein according to the following outline:

1.0 GENERAL OVERVIEW
   1.1 INTRODUCTION
   1.2 OVERVIEW
2.0 EXAMPLE OF A MULTICOMPUTER DATA TRANSFERRING SYSTEM
3.0 EXAMPLE OF A ROTATING BASE STATION
   3.1 STRUCTURAL DESCRIPTION
   3.2 FUNCTIONAL DESCRIPTION
   3.3 CONFIGURING A ROTATING BASE STATION
4.0 DATA TRANSFERS BETWEEN A ROTATING BASE COMPUTER AND A TAG COMPUTER
   4.1 TRANSFERS NOT RELYING ON EXECUTING ROTATING BASE STATION CLIENT SOFTWARE
   4.2 TRANSFERS RELYING ON ROTATING BASE STATION CLIENT SOFTWARE
5.0 EXAMPLE OF A TAG COMPUTER
   5.1 BATTERY-RELATED CONSIDERATIONS
   5.2 DETERMINING A LOCATION OF A TAG
6.0 SECURITY CONSIDERATIONS
7.0 ROTATING MECHANISM AND AN ANTENNA DESIGN
8.0 PARABOLIC ANTENNA REFLECTOR
9.0 ALTERNATIVE ANTENNAS OF A ROTATING BASE STATION
10.0 WAKE AND LISTEN MODE
11.0 DISCOVERY 12.0 ANGULATION DISCOVERY STATE
13.0 DETERMINING A MAGNETIC HEADING
14.0 RESOURCE CONSERVATION
15.0 MULTICOMPUTER DATA TRANSFERRING SYSTEM WITH A SINGLE ROTATING BASE STATION
16.0 MULTICOMPUTER DATA TRANSFERRING SYSTEM WITH MULTIPLE ROTATING BASE STATIONS
17.0 COMPASS CALIBRATION
18.0 COMPUTING A MAGNETIC HEADING
19.0 RELATIVE POSITIONING MODE
20.0 GEOGRAPHIC POSITIONING MODE
21.0 SECURITY AND ENCRYPTION
   21.1 EXAMPLE X.509 CERTIFICATE
   21.2 ASYMMETRIC ENCRYPTION MODE
   21.3 SYMMETRIC ENCRYPTION MODE
   21.4 PACKET TYPE HEADERS
      21.4.1 PACKET TYPES IN ASYMMETRIC ENCRYPTION MODES
      21.4.2 PACKET TYPES IN SYMMETRIC ENCRYPTION MODES
22.0 UNSECURED MULTICOMPUTER DATA TRANSFERRING SYSTEM
23.0 INTER-STATIONS COMMUNICATIONS AND PAIRING
24.0 SYNCHRONIZATION OF A ROTATING BASE STATION
25.0 CALCULATING A RANGE WITH PACKET FLIGHT TIME
26.0 SUPPORTING CLIENT DEVICES WITH NO RBS CLIENT SOFTWARE
27.0 WIRELESS INTRUSION DETECTION MODE
28.0 ANALOG RADIO DETECTION MODE
29.0 RBS RADIO POSITIONING TAGS
30.0 RBS-TAG WAKE PACKETS
31.0 STEALTH RBS-TAGS
32.0 EMBEDDED STEALTH RBS-TAGS
33.0 PROXIMITY TAGS
34.0 SOFTWARE-BASED ROTATING BASE STATIONS
35.0 PORTABLE SOLAR ROTATING BASE STATIONS
36.0 RBS WIRELESS ACCESS POINT MODE
37.0 IMPLEMENTATION MECHANISMS-HARDWARE OVERVIEW
38.0 OTHER ASPECTS OF DISCLOSURE 1.0 General Overview 1.1 Introduction In an embodiment, a rotating base station (RBS) is an electronic device configured to wirelessly communicate with other electronic devices to determine locations of the other devices without interacting with a Global Positioning System (GPS). An RBS may be configured to generate and transmit communications, such as packets or frames, to other devices, and receive communications, such as packets or frames, generated by and transmitted from other devices. Communications exchanged between an RBS and other devices may be communicated in compliance with any of the communications protocols used by analog radios, digital radios, and including the Bluetooth, Wi-Fi (including 802.11), and the like.

In an embodiment, an RBS determines a location of a particular electronic device based on contents of communications transmitted to the particular device and contents of communications received from the particular electronic device.

In an embodiment, a communication exchanged between an RBS and other electronic devices comprises an RBS identifier (RBSID) that uniquely identifies the RBS and allows distinguishing the RBS from other RBSes present in a multi-RBS configuration. The RBSID also allows distinguishing the RBS from other electronic devices present in a multi-device configuration.

In an embodiment, an RBS comprises a reflector, a motor, an antenna, an antenna cable, and one or more additional components. The reflector is mounted on the top of the motor. The reflector is configured to rotate, while the antenna, the antenna cable, and other components of the RBS remain stationary. One of the benefits of the design of the RBS is that no slip ring to connect the antenna cable to the antenna is required. This is because only the reflector rotates, while the other components do not. Typically, a slip ring uses brushes to connect a stationary component and a rotating component, and therefore, the slip ring can wear out quickly; especially if the reflector rotates quickly. Another benefit of the design is that the motor may be implemented as a brushless DC motor, and therefore, no moving-brush-contact occurs between any parts of the RBS. The brushless RBS design also allows for high rotation rates with high reliability because the risk of the components' wear is rather low.

In an embodiment, a communication generated by an RBS comprises information about a barometric pressure at a place where the RBS is located. The barometric pressure may be used to determine a location of the RBS.

In an embodiment, a communication generated by an RBS comprises information about a magnetic heading of the reflector in the RBS. A magnetic heading is an indication of the location and the direction in which the RBS reflector is facing.

In an embodiment, communications between an RBS and other electronic devices are encrypted. To ensure the packets' authenticity, an RBS may for example, cryptographically sign its packets using cryptographic keys.

In an embodiment, an RBS is configured to periodically transmit unsigned beacons with information about magnetic headings and time stamps to enable frequent calculations and recalculations of the magnetic heading of the RBS or other electronic devices.

In an embodiment, an RBS provides positioning information that makes it possible for client devices to determine their own positions.

In an embodiment, an RBS is configured to determine a location of another electronic device. For example, an RBS may communicate with another electronic device, such as an electronic tag (also referred to as a tag), to determine the location of the tag. Determining the location of the tag may include determining for example, a geographical location of the tag, a relative geographical location of the tag in relation to an RBS, and so forth.

An RBS may be configured to communicate with a variety of electronic devices, including analog radio devices, smartphones, laptops, and any other electronic devices that are configured to wirelessly communicate with an RBS.

In an embodiment, a multicomputer data transferring system comprises a plurality of RBSes. The RBSes may use triangulation to compute locations of other electronic devices, such as any Wi-Fi enabled device. The RBSes may compute the locations of other electronic devices regardless of whether the electronic devices have installed and executed a software application configured to interact with an RBS.

In an embodiment, an RBS is configured to communicate with low cost Bluetooth Low Energy (BLE) tags. The tag may host an embedded application allowing an RBS to communicate with the tag. A BLE tag is usually light weight and small in size. It can be implemented in a small container that can be easily attached to humans, animals or objects.

In an embodiment, a multicomputer data transferring system manages long-range wireless communications using timed and aligned communications between a plurality of RBSes. The timed/aligned RBS communications significantly extend a wireless range. It can be used for Wi-Fi, Bluetooth low energy (BLE), or any wireless protocol. This is significant especially for embedded computers with BLE with limited battery power. The BLE-based solutions are usually power efficient; however, they typically do not have the range to maintain communications through for example walls, or to operate on for example, a cow pasture. With the RBS' timed and aligned communications, the BLE-based solutions may maintain long-range connectivity.

One of the benefits of using an RBS is the accuracy with which the RBS determines location information of other electronic devices, including tags. Its indoor and outdoor accuracy is usually better than the accuracy provided by the GPS technology.

Another benefit of using an RBS is a wide range of communications protocols that the RBS may implement. For example, an RBS may communicate using wireless protocols, such as Wi-Fi, Bluetooth Low Energy (BLE), an protocols used by digital radios, or analog radios.

In an embodiment, an RBS is configured to track a magnetic heading needed to film or photograph an object. A single RBS can also detect the position of an object using its magnetic heading and range detection capability. It can use fine grain signal strength measurements or time of arrival (ToA) to estimate the range.

In an embodiment, an RBS is configured to detect a location of an analog device allowing to pinpoint sources of the Radio Frequency (RF) interference. It can also detect the location of malicious digital wireless devices that are injecting packets to perform a denial of service or to break the security of an encrypted wireless network. None of these capabilities is possible using the GPS or existing indoor positioning systems 1.2 Overview In an embodiment, a data transferring system comprises: a rotating base station computer, which comprises a rotatable reflector, an antenna, and a transmitter.

In an embodiment, the data transferring system is configured to perform: as the rotatable reflector rotates around the antenna which remains static when the rotatable reflector rotates, periodically transmitting a plurality of base broadcast wireless communications from the transmitter. In response to transmitting the plurality of base broadcast wireless communications, a plurality of tag response wireless communications is received from a particular tag computer, from one or more tag computers.

In response to receiving the plurality of tag response wireless communications from the particular tag computer: based on, at least in part, the plurality of tag response wireless communications, a plurality of signal strength values associated with the plurality of tag response wireless communications is determined. Based on, at least in part, the plurality of signal strength values, a tag magnetic heading of the particular tag computer is determined. The tag magnetic heading indicates a relative location of the particular tag computer with respect to the rotating base station computer.

In an embodiment, the rotating base station computer operates as timed and aligned with one or more other rotating base station computers.

In an embodiment, the rotating base station computer further comprises a cable antenna that is communicatively coupled to the antenna.

In an embodiment, the antenna and the cable antenna remain stationary when the rotatable reflector rotates around the antenna.

In an embodiment, the rotatable reflector is a parabolic reflector that directs a transmission of the plurality of base broadcast wireless communications toward an opening in the rotatable reflector as the rotatable reflector rotates around the antenna.

In an embodiment, the rotating base station computer further comprises a magnetic sensor configured to determine a base magnetic heading of the rotating base station computer.

In an embodiment, the base magnetic heading indicates a location of the rotating base station computer.

In an embodiment, the rotating base station computer is further configured to perform: determining the tag magnetic heading of the particular tag computer based on, at least in part, the plurality of signal strength values, and the base magnetic heading of the rotating base station computer.

In an embodiment, the rotating base station computer is further configured to perform: as the rotatable reflector rotates around the antenna which remains static when the rotatable reflector rotates, periodically receiving a plurality of tag broadcast wireless communications from the particular tag computer. In response to receiving the plurality of tag broadcast wireless communications, a plurality of base response wireless communications is generated, and the plurality of base response wireless communications is broadcast. The broadcasting of the plurality of base response wireless communications causes the particular tag computer to: receive one or more responses, from the plurality of base response wireless communications. In response to receiving the one or more responses, from the plurality of base response wireless communications, the particular tag computer determines the relative location of the particular tag computer with respect to the rotating base station computer.

In an embodiment, a base broadcast wireless communication, from the plurality of base broadcast wireless communications transmitted from the transmitter, comprises an identifier of the rotating base station computer. The identifier of the rotating base station computer is one or more of: a MAC address of the rotating base station computer, or a customized identifier configured on the rotating base station computer.

In an embodiment, communications broadcast from the rotating base station computer and communications broadcast from the one or more tag computers are encrypted.

In an embodiment, the data transferring system further comprises one or more additional rotating base station computers, each of which is configured to broadcast base wireless communications to the one or more tag computers, each of which is configured to receive tag wireless communications from the one or more tag computers, and each of which is configured to determine magnetic headings of one or more of the one or more tag computers.

2.0 Example of a Multicomputer Data Transferring System

FIG. 1 depicts an example multicomputer data transferring system with one or more rotating base stations and one or more tag computers according to an example embodiment. Even though the example multicomputer data transferring system 100, depicted in FIG. 1, shows one RBS 110 and one tag computer 120, multicomputer data transferring system 100 may include a plurality of RBSes 110 and a plurality of tag computers 120.

In an embodiment, one or more RBSes 110 may communicate with one or more tag computers 120 directly, or via a computer network 130. Furthermore, one or more RBSes 110 may communicate with other RBSes directly, or via computer network 130. Moreover, one or more tag computers 120 may communicate with one or more RBSes 110 directly, or via computer network 130.

Computer network 130 may be any type of computer network, such as a Radio Frequency (RF) network, any type of wireless network, a LAN, a WAN, and any other type of network.

In an embodiment, RBS 110 is a computer device configured to establish a communications connection with other computer devices, such as tag computer 120 or another RBS 110 if such is present. RBS 110 may establish a communications connection with one or more tag computers 120 in order to determine locations of the one or more tag computers, and therefore to determine the locations of the persons wearing the corresponding tags or to determine the locations of the objects to which the corresponding tags are attached. RBS 110 is described in detail in FIG. 2.

In an embodiment, tag computer 120 is configured to communicate with one or more RBSes 110 to provide information requested by the RBS.

In an embodiment, tag computer 120 is implemented as a RBS Radio Positioning Tag (RBS-Tag), and uses either the 802.11 protocol-based the System on Chip (SoC) technology, or Bluetooth Low Energy (BLE) SoC that may be detectable by RBS 110.

3.0 Example of a Rotating Base Station 3.1 Structural Description

Figure 2:
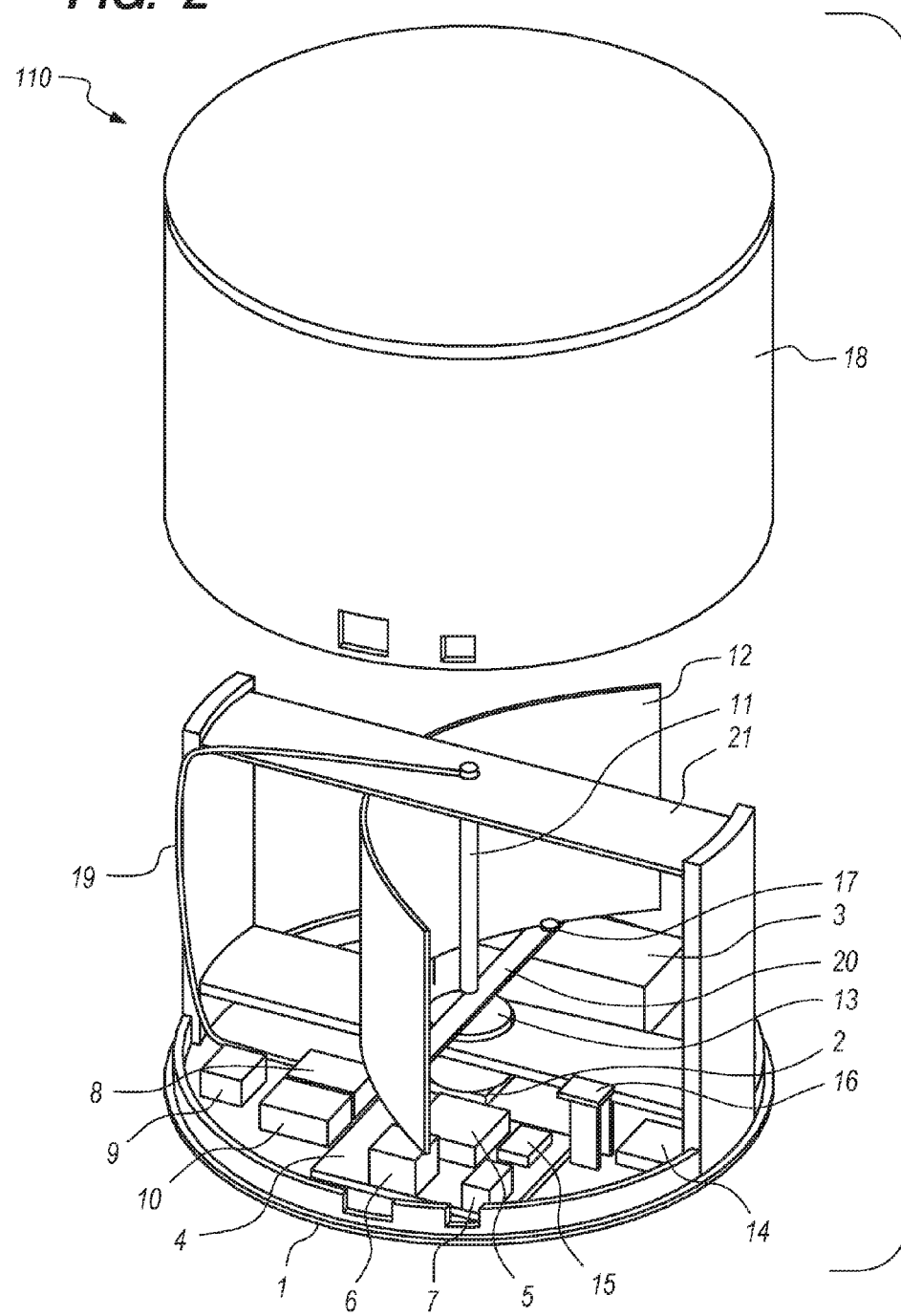
FIG. 2 depicts a rotating base station according to an example embodiment.

FIG. 2 depicts a rotating base station 110 according to an example embodiment. RBS 110 depicted in FIG. 1 is merely an example implementation of the RBS configured to enable data transferring between an RBS and a tag computer to detect a location of the tag computer. Other implementations, not depicted in FIG. 1, may differ from the implementations depicted in FIG. 2 in terms of the size, the shape, the location of the components, and the like.

In an embodiment, RBS 110 comprises a base 1, a base frame 2, an optional battery 3, and a main computer board 4. Base frame 2 may look like a small table firmly attached to base 1. Base frame 2 may be used to support a Brushless Direct Current Motor (BLDC) motor 13 that in turn holds the Parabolic Antenna Reflector (PAR) 12.

PAR 12 is a rotating component of RBS 110. It may be configured to convert omni-directional radio waves transmitted from ODA 11 to directional radio waves. PAR 12 may also be configured to collect incoming radio waves and concentrate them onto ODA 11.

ODA 11 can be a dipole antenna with linear polarization, a 4-blade Skew Planar antenna with circular polarization, or a smaller ceramic circular polarized antenna. Skew Planar antennas are larger and will require a larger PAR 12 and larger RBS. Circular polarized antennas allow an RBS to receive line-of-sight radio signals from common linear polarized antennas in any orientation. A vertically oriented dipole ODA 11 will miss line-of-sight signals transmitted from horizontal linear polarized antennas, but pick up bounce signals causing the RBS to compute an incorrect incoming radio signal direction.

RBS 110 may include a System on Chip (SoC) processor 5 that is small and energy efficient. SoC processor 5 may be configured to be able to transmit thousands of packets per second while performing at least one FIPS grade ECDSA or DSA key signature per second. SoC processor 5 is also configured to analyze radio signals. Furthermore, SoC processor 5 may be configured to run an HTTP Web Server.

In an embodiment, RBS 110 comprises a Power over Ethernet (PoE) input 6 for data connectivity and power input. RBS 110 may also include an optional DC power input 7.

In an embodiment, RBS 110 comprises a digital radio transceiver 8 that supports multiple frequencies and protocols. Common frequencies are 2.4 GHz to 5.8 GHz, although other frequencies may also be supported by digital radio transceiver 8. Communications protocols implemented in digital radio transceiver 8 include 802.11 and Bluetooth Low Energy (BLE) communications protocols.

In an embodiment, RBS 110 comprises a few optional elements, such an optional coax splitter 9 to support multiple radios per each of the antenna, and an optional Software Defined Radio (SDR) transceiver 10 that can collect a wide spectrum of analog radio signals. SDR transceiver 10 may be used to triangulate the location of analog radio systems.

In an embodiment, RBS 110 comprises a BLDC motor 13. BLDC motor 13 may be mounted between base 1 and PAR 12. This type of mounting of BLDC motor 13 allows PAR 12 to rotate with respect to base 1. Alternatively, a DC motor may be used.

In an embodiment, RBS 110 comprises a BLDC motor driver board 14. If a DC motor is used, instead of BLDC motor 13, then a DC motor driver is included in RBS 110.

RBS 110 may also include an Inertial Measurement Unit (IMU) 15, which may be equipped with a linear and angular accelerometer, a barometer, and a magnetometer.

RBS 110 may also include a hall sensor 16 configured to detect an orientation of PAR 12. There may be also a magnet 17 mounted on PAR 12 that actuates hall sensor 16.

RBS 110 may also include a cover 18 to cover, at least partially, RBS 110. Cover 18 may be made out of plastic, or any other compound suitable for covering, at least partially, RBS 110.

In an embodiment, RBS 110 comprises a coax cable 19 that is used to connect one or more radio devices with an omni-directional antenna.

RBS 110 may also include a support plate 20 that connects PAR 12 to BLDC motor 13, and provides support for magnet 17. Support plate 20 may also include additional metal elements to help balance the weight of PAR 12 and to provide stability to RBS 110 as the movable elements of RBS 110 rotate.

In an embodiment, base 1 is used to firmly hold certain components of RBS 110, such as battery 2, main computer board 4, digital ratio transceiver 8, coax splitter 9, SDR 10, BLDC motor 13 including BLDC motor driver 14, hall sensor 16, and cover 18.

In an embodiment, main computer board 4 hosts certain components of RBS 110, such as SoC processor 5, PoE 6 and optional DC input 6.

In an embodiment, cover 18 is used to protect certain components of RBS 110, and to provide support to omni-directional antenna (ODA) 11. It is also a focal point of PAR 12.

In an embodiment, BLDC motor 13 comprises a rotating shaft. The rotating shaft of BLDC motor 13 may be bolted to support plate 20, which in turn may be bolted to PAR 12.

In an embodiment, RBS 110 comprises an antenna holder 21. Antenna holder 21 may be implemented as an elongated rectangular plate. The center of the elongated rectangular plate may be attached to ODA 11. Two opposite edges of the elongated rectangular plate may be attached to plastic cover 18 of RBS 110.

In an embodiment, coax cable 19 is configured to link one or more digital ratios 8 to ODA 11. Furthermore, coax cable 19 may be optionally configured to link digital radios 8 to the coax splitter 9 so that it can connect digital radios 8 to SDR 10.

In an embodiment, BLDC motor driver 14 is configured to control BLDC motor 13. BLDC motor driver 14 may be configured to control BLDC motor 13 through two or three communications wires.

In an embodiment, IMU 15 is connected to main computer board 4. IMU 15 may have its power and data pins connected to main board 4, and may be used to compute a magnetic heading and a barometric pressure of RBS 110.

3.2 Functional Description

In an embodiment, RBS 110 is configured to operate in one or more operating modes. In one operating mode, RBS 110 broadcasts digital radio signals that help tag computers 120, such as smartphones, tablets, and the like, to determine their location. Tag computer 120 may execute an RBS signal analysis software applications to determine, based on the digital radio signals received from RBS 110, the location of tag device 120. This mode may be referred to as a broadcast mode.

A broadcast mode is a mode in which RBS 110 broadcasts digital radio signals to a plurality of tag computers 120. The broadcast mode may allow the plurality of tag computers 120 to determine their respective locations without having RBS 120 to increase the packet broadcast rate since the broadcast packets may be received by any number of tag computers.

In an embodiment, RBS 110 receives and processes digital signals broadcast, or otherwise transmitted, by tag computers 120. In this mode, RBS 110 may detect a location of tag computer 120, such as a smartphone or an RBS-Tag, by receiving and processing radio broadcast transmitted by tag computer 120. RBS 110 may receive two types of radio signal generated and transmitted by tag computer 120. A first type of the radio signals is a radio signal that is generated by tag computer 120 as tag computer 120 executes an RBS client software application. This radio signal may be generated in response to a request received from RBS 110, or spontaneously by tag computer 120. A second type of the radio signals is a radio signal that is generated by tag computer 120 on which an RBS client software application has not been installed.

Also in this mode, RBS 110 may track a location of tag computer 120. RBS 110 may be configured to track a location of tag computer 120 regardless of whether an RBS client software application is installed and executed on tag device 120.

In an embodiment, RBS 110 is configured to detect a malicious radio activity taking place in computer network 130. For example, if computer network 130 is an encrypted 802.11 Wireless LAN and a malicious user is trying to penetrate the encrypted network 130 by injecting malicious wireless packets to terminate communications connections between devices in network 130 or that attempt to decipher the network's wireless encryption key, then RBS 110 may be configured to determine and provide a physical location of the malicious user to the security authorities.

Furthermore, RBS 110 may be configured to track down a source and a location of analog interference.

3.3 Configuring a Rotating Base Station

In an embodiment, RBS 110 is configured by executing an RBS configuration software application on a smartphone that is communicatively coupled with RBS 110. Configuring RBS 110 may include executing the RBS configuration software application to configure RBS 110 with for example, a MAC address of RBS 110 and MAC addresses of other rotating base stations and tag computers 120 communicating with RBS 110. Furthermore, configuring RBS 110 may include executing the RBS configuration software application to enable RBS 110 with various capabilities, such as an encryption, an authentication, a relative or geographic positioning mode, an operating speed management, or other features implemented in RBS 110.

4.0 Data Transfer Between a Rotating Base Station and a Tag Computer

In an embodiment, RBS 110 communicates with tag computer 120 implemented as a smartphone, a laptop, a tablet, an electronic chip, or other electronic device configured to receive and transmit wireless communications and configured to execute an RBS client software application. To illustrate clear examples, RBS 110 may communicate with tag computer 120 implemented in a smartphone, which for simplicity, may be referred to as smartphone 120. However, the examples of tag device 120 are not limited to smartphones. Other electronic devices configured to receive and transmit wireless communications and execute RBS client software may also communicate with RBS 110.

In an embodiment, RBS 110 and a smartphone are configured to use radio signals generated by their respective components to determine a location of the smartphone. The radio signals may be exchanged in compliance with the 802.11 protocol or the Bluetooth Low Energy (BLE) protocol. The radio signals may be broadcast as 802.11 frames or BLE data packets. For simplicity, the broadcast frames or packets are referred to as communications. The broadcast nature of the signals allows any number of 802.11 or BLE devices to capture and analyze the signals without any type of paring process. Therefore, any wireless device configured with the RBS client software, including a smartphone device, a laptop, a tablet, and the like, can be enabled to receive the radio signals.

4.1 Transfer not Relying on Executing Rotating Base Station Client Software

To enable a data transfer between RBS 110 and smartphone 120, it may not necessary to configure smartphone 120 with an RBS client software application. The fact that RBS 110 may communicate with smartphone 120 even if no RBS client software application is installed on smartphone 110 is significant because it allows implementing the data transfer between RBS 110 and any smartphone 120 even if smartphone 120 is not customized to communicate with RBS 110. In situations when smartphone 120 is implemented without an RBS software application, smartphone 120 is part of the same wireless network that includes RBS 110.

When smartphone 120 is not configured with an RBS client software application, RBS 110 and smartphone 120 may communicate with each other by taking an advantage of the features of the Wi-Fi protocol or other protocols. For example, RBS 110 and smartphone 120 may use a ping request and a response to the ping request to identify each other to another. For instance, RBS 110 may broadcast a ping request to a wireless network; smartphone 120 may receive a ping request from RBS 110; and upon receiving the request, smartphone 120 may reply to the ping request.

Based on the reply to a ping request, RBS 110 may compute a location of smartphone 120. For example, RBS 110 may analyze the strength of the received signal, also referred to as a Received Strength Signal Indication (RSSI). Based on the RSSI of the received signal, RBS 110 may determine a magnetic heading of the antenna reflector to compute a magnetic heading to smartphone 120.

If RBS 110 is executing an HTTP Web Server application, then RBS 110 may be configured to generate and send data containing the location information of smartphone 120 to smartphone 120 or another device. The location information may be sent using frames in accordance with the 802.11 protocol and over a wireless LAN. The location information may be displayed on smartphone 120 in a form of a webpage generated by an HTTP Web Browser application executed by smartphone 120.

Location information determined by RBS 110 may be displayed on any type of communications devices, including smartphones, personal computers, workstations, PDAs, laptops, tablets and other electronic devices even if they are not executing an RBS client software application.

4.2 Transfer Relying on Executing Rotating Base Station Client Software

In an embodiment, smartphone 120 is configured to execute an RBS client software application. The RBS software application executed on smartphone 120 may be configured to analyze radio transmissions received from RBS 110. The RBS client software application may be configured to for example, measure an RSSI, compute a magnetic heading of smartphone 120, and send the magnetic heading information to RBS 110.

Based on the magnetic heading information received from smartphone 120, RBS 110 may compute location information of smartphone 120, and transmit the location information to smartphone 110.

An RBS client software application may be installed on smartphones and other electronic devices. An RBS client software application may be customized for a device on which the application is installed. For example, if an RBS client software application is installed on a tablet, then the RBS client software application may include the functionalities specific to the tablet and specific to communicating with RBS 110.

5.0 Example of a Tag Computer

Tag computer 120 may be any type of electronic device configured to communicate with RBS 110. Examples of tag computers 120 may include smartphones, tablets, laptop computers, or any other computing device equipped with for example, a radio. Tag computer 120 may also be an RBS-Tag, which is a small circuitry board that is configured to at least generate and transmit broadcast signals.

In an embodiment, tag computer 120 is a small computer device equipped with a radio, a microcontroller, and a battery. Tag 120 may use the 802.11 Wi-Fi, BLE, or other analog or any digital radio communications protocol to communicate with RBS 110.

If tag 120 and RBS 110 communicate in accordance with the 802.11 Wi-Fi protocol, then tag 120 and RBS 110 may take an advantage of the rich set of software and security features offered by the 802.11 Wi-Fi protocol.

In an embodiment, one or more tag computers 120 and one or more RBSes 110 operate in the 802.11 mode within a computer network that implements the 802.11. In such a configuration, each RBS 110 present in the computer network is provided with a MAC address of any other RBS present in the computer network, and with a MAC address of any tag computer 120 present in the computer network. The MAC addresses may be provided, or otherwise supplied by configuring the respective devices either manually or automatically. A configuration software application may be an HTML web based application or any other customized application running on a server or a smartphone.

5.1 Battery-Related Considerations

In situations when tag computer 120 is implemented as an RBS-Tag, which typically is small in size, conserving a life span of the battery installed in the RBS-Tag is rather desirable. Conserving the battery's life span may be accomplished in many ways. For example, instructions may be issued to a microcontroller of the RBS-Tag to put the microcontroller into a sleep state when the microcontroller is not used. In camera-tracking applications, a tag may be put into a sleep state when it no longer detects that an RBS is probing it for an acknowledgement response. When a user wants to use the tag, the tag may be manually awaken by for example, pressing a button implemented on the tag. Pressing the button may cause issuing a reset command to the microcontroller of the tag.

In an embodiment, a tag is configured and used to track locations of humans, animals, and/or objects. For example, a tag may be associated, or affixed, to an animal, a pet, or a child. A particular application may include affixing tags to a herd of sheep in a sheep farm. In such a situation, a manual reset of the tag may not be feasible as the sheep could be far away from the person who can operate a reset button. When performing a manual reset of the tag is not feasible, an automated wake procedure may be implemented. An automated wake procedure may be implemented by invoking for example, certain operating states available in the 802.11 Wi-Fi protocol.

5.2 Determining a Location of a Tag

In an embodiment, tag computer 120 is a computer or device configured to respond to probes generated and transmitted by RBS 110. For example, upon receiving a probe from RBS 110, tag computer 120 may generate a response to the probe, and transmit the probe to RBS 110. Upon receiving the response to the probe, RBS 110 may process the received response to determine a location of tag computer 120. For example, RBS 110 may generate and transmit UDP packets or probe frames to solicit an acknowledgement (ACK) reply from tag computer 120, and upon receiving the ACK reply from tag computer 120, RBS 110 may use the received reply to determine a location of tag computer 120.

In an embodiment, tag computer 120 is a computer configured with a MAC address known to other devices in a computer network. However, tag computer 120 configured with a MAC address may not be configured to receive and process signals transmitted by RBS 110, and therefore, may not be configured to participate in a discovery processes initiated by RBS 110 or other tag computers 120. Therefore such a tag computer 120 cannot be discovered using a discovery process.

Configuring tag computer 120 with a MAC address may be performed by connecting tag computer 120 to a 802.11 network that includes one or more RBSes 110, and configuring tag computer 120 with a MAC address manually. The MAC address assigned to tag computer 120 may be communicated to RBS 110. By providing the MAC address of tag computer 120 to RBS 110, the discovery process of tag computer 120 by RBS 110 may be avoided.

In an embodiment, tag computer 120 is configured to execute an RBS client software application. Executing the RBS client software application may allow tag computer 120 to detect a location of RBS 110 and locations of other tag computers. For example, by executing the RBS client software, tag computer 120 may request and receive angular positioning data from RBS 110 and use the received angular positioning data to determine a location of RBS 110.

In an embodiment, one or more RBSes 110 determine location information of a location of tag computer 120, and provide the location information to tag computer 120 to allow tag computer 120 to determine its location with respect to RBSes 110. The RBSes 110 may provide the location information of the location of tag computer 120 to tag computer 120 by providing angular positioning data to tag computer 120. Tag computer 120 may use the angular positioning data to determine its location by triangulating the received positioning data in relation to RBSes 110.

In an embodiment, tag computer 120 is configured to conserve a lifespan of the battery used by tag computer 120. Tag computer 120 may accomplish this by managing a sleep state of the tag computer's radio devices and/or by managing a sleep state of the tag computer's microprocessor. This capability may be applicable to any type of tag computer 120, including an RBS-Tag.

6.0 Security Considerations

In an embodiment, data communications between one or more RBSes 110 and one or more tag computers 120 are secured. Security may be provided by the 802.11i standard, or any other security-based standard or protocol. For example, securing data communications between RBS 110 and tag computer 120 may be implemented using the Wi-Fi Protected Access II (WPA2) protocol, and/or pre-shared keys (PSK) protocol. Security may also be provided by implementing the more robust, Extensible Authentication Protocol (EAP).

In the PSK mode, one or more RBSes 110 and one or more tag computers 120 share a common key for all RBSes and tags. In contrast, in the EAP mode, the devices use keys per-device. For example, one of RBSes 110 may be elected as a master RBS, and the master RBS may act as the 802.11 Access Point (AP) to provide authentication services for EAP mode. An external 802.11 AP with an external EAP authentication provider may also be used. If RBSes 110 and tag computers 120 span a relatively large area, then maintaining secure connections between the computers may require using a plurality of APes. Due to a transmission range limitation of a directional reflector antenna of an individual RBS, a solution utilizing an external 802.11 AP may require multiple APs to cover the large area.

7.0 Rotating Mechanism and an Antenna Design

In an embodiment, RBS 110 uses BLDC motor 13 to rotate PAR 12, while ODA 11 remains stationary. One of the benefits of such a design is that it eliminates the need for a slip ring.

A slip ring is a component that allows transmitting electric power or signals from a stationary device to a rotating structure. However, when ODA 11 remains stationary, a slip ring is not required because, as depicted in the example shown in FIG. 2, digital radio transceiver 8 and ODA 11 are both stationary.

Figure 3:
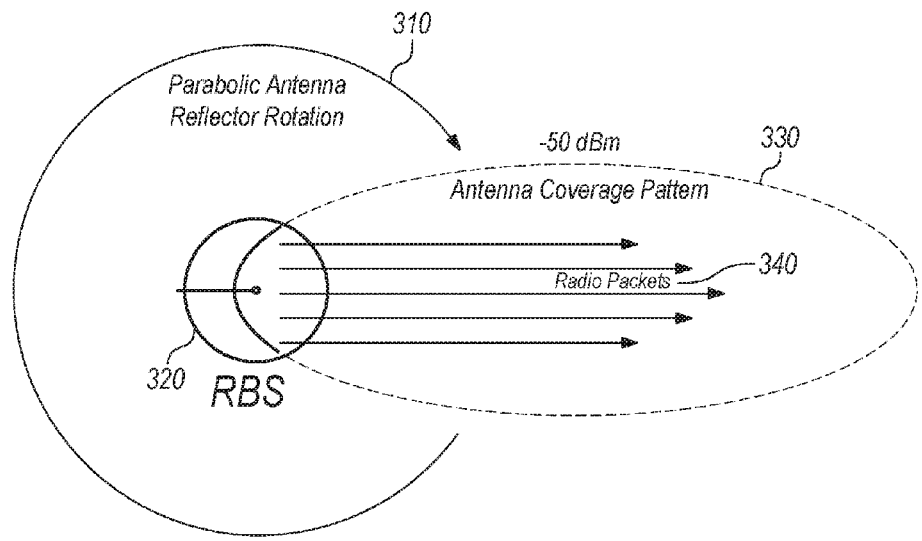
FIG. 3 depicts an example antenna coverage pattern for a rotating base station according to an example embodiment.

FIG. 3 depicts an example antenna coverage pattern for a rotating base station according to an example embodiment. In the depicted example, data packets 340 transmitted from RBS 320 with equal radio energy levels form a narrow lobe 330. A conceptual −50 dBm signal level pattern is formed by PAR 12. A parabolic antenna reflector rotation is depicted using a curve 310. The rotating reflector causes this lobe to sweep 360 degrees around the horizontal plane.

8.0 Parabolic Antenna Reflector

In an embodiment, PAR 12 is a parabolic reflector that partially surrounds antenna 11. PAR 12 comprises a parabolic wall and a parabolic opening. PAR 12 is used to direct wireless communications, transmitted by RBS 110, in the direction toward the parabolic opening. Since PAR 12 partially surrounds the antenna, the wireless communications transmitted by RBS 110 in the direction pointing toward the parabolic wall are reflected from the parabolic wall and follow the direction pointing toward the parabolic opening. The wireless communications that are transmitted by RBS 110 in the direction pointing toward the parabolic opening are not blocked.

In an embodiment, PAR 12 has a light weight construction. One of the benefits of using a light weight PAR 12 is that the light constructions ensures a low energy consumption. Usually, the lighter PAR 12 is, the less energy it consumes. To maintain a light weight, components of PAR 12 are usually made of light-weight materials.

In an embodiment, PAR 12 comprises one or more components made out metal such as a sheet metal, a metal mesh grill, or a light weight Mylar. The metal components may be wrapped around a parabolic wireframe.

In an embodiment, PAR 12 rotates around a parabolic focal point. The focal point may correspond to a location of the central axis of ODA 11. PAR 12 may be designed in such a way that the device is balanced in any stage of the rotation. The balance may be achieved by balancing the weight of components of PAR 12 and balancing the location of the components with respect to each other. The slightest imbalance may cause RBS 110 to shake (wobble) and/or vibrate.

9.0 Alternative Antennas of a Rotating Base Station

In an embodiment, RBS 110 is equipped with one or more alternative antennas. Alternative antennas may be implemented as Yagi antennas, Log Periodic antennas, Microstrip antennas (also referred to as patch antennas), sectors antennas, parabolic dish with an attached antennas, or any directional antenna that can be integrated with RBS 110. The Yagi or Log Periodic antennas may be implemented to form a flat, circular, disk-like RBS device. Flat, circular, disk-like RBS devices may be particularly appropriate for applications for specific locations, such as an application for locating RBS-Tags in an airplane wing.

Implementations that include alternative antennas may incorporate slip rings to stabilize the antennas. A slip ring may provide some stability to the antenna when the antenna is rotating and moving with respect to a stationary radio.

In an embodiment, a radio and a computer that handles communications with RBS 110 are attached to an alternative antenna. In this type of configuration, the radio and the computer rotate in conjunction with the RBS 110, and therefore, a need for a slip ring may be avoided. However, a slip ring may be still needed between the radio-antenna implementation and a power supply as the power supply is usually stationary. In this situation, power may be supplied via a Power over Ethernet (PoE) Gigabit Ethernet. This solution may be, however, relatively impractical if an 8-conductor slip ring is used.

In an embodiment, the power and data connectivity issue is solved without using a slip ring. The solution may include using a battery and the 802.11 wireless network connectivity. This configuration, however, may have some limitations caused by the limitations of the battery and performance limitations of the communications network.

10.0 Wake and Listen Mode

In an embodiment, tag computer 120 is configured to operate in an active state. To operate in an active states, tag computer 120 may set its components to an active state. The process of setting the components to an active state is referred to as waking. The frequency with which tag computer 120 wakes up depends on an implementation. Tag computer 120 may wake up for example, every "n" seconds, where n belongs to a set=[10 seconds, 60 seconds].

In an embodiment, tag computer 120 configured to operate in an active state is also configured to "listen" beacon signals, also referred to as beacons. A mode in which tag computer 120 is awaken and listens to beacons is referred to as a wake and listen mode.

Beacons may be transmitted by various devices, including RBS 110. Examples of beacons may include an SSID beacon and an 802.11 AP beacon. A beacon may be transmitted periodically. For example, a beacon may be transmitted once every 100 milliseconds or every any other time interval allowable by the beacon's specification.

In an embodiment, an SSID beacon interval is included in every SSID beacon frame sent by RBS 110.

Tag computer 120 may be configured to test whether a beacon is received. The testing may be performed at a certain frequency, such as 100 milliseconds, or other frequency. If no beacon is detected within 100 milliseconds or within other time period, tag computer 110 may exit an active state. Exiting the active state is also referred to as entering an inactive state, or going to sleep. Tag device 120 may be configured to enter an inactive state for a certain time period, such as "n" seconds. Tag device 120 may also be configured to enter an active state upon the expiration of the inactive state. Entering the active state corresponds to entering a wake and listen mode.

11.0 Discovery

A discovery state is a state in which a device, such as RBS 110 or tag device 120, transmits communications, based on which the device may discover other devices in the network. RBSes 110 and tag computers 120 may perform a discovery of other devices in a computer network. A discovery state for RBS 110 may last for a duration of one revolution or 0.2 seconds if RBS 110 is rotating 5 revolutions a second.

In an embodiment, tag computer 120 is configured to enter a tag discovery state. Tag computer 120 may enter a tag discovery state when tag computer 120 is operating in a wake and listen mode, and, while operating in that mode, tag computer 120 detects a beacon, such as an SSID beacon.

Tag computer 120 may be configured to generate and broadcast the User Datagram Protocol (UDP) datagrams, which for simplicity are referred to as communications. The UDP communications may be broadcast to one or more RBSes 110 located in a communications network, such as the 802.11 network.

In an embodiment, tag computer 120 broadcasts multiple UDP datagrams to a computer network. Broadcasting multiple UDP datagrams increases the likelihood that at least one RBS 110 in the network receives at least one UDP communication from tag computer 120. The broadcasting of multiple UDP packets also increases the likelihood that each of a plurality of RBSes 110 may detect the presence of tag computer 120.

Frequency with which UDP datagrams are broadcast is usually determined based on the specification of the components of RBS 110. For example, if RBS 110 is configured to rotate 5 revolutions per second and an antenna reflector beam is configured with a width of 10 degrees, then tag computer 120 may be configured to broadcast 180 UDP datagrams per second.

In an embodiment, tag computer 120 is configured to detect RBS 110. Tag computer 120 may transmit UDP broadcast communications to a computer network. RBS 110 may be configured to transmit a Transmission Control Protocol (TCP) unicast segment to tag computer 120 upon receiving at least one communication, from the UDP broadcast communications and if tag computer 120 is reachable within the computer network. Based on the received TCP segment, tag computer 120 may determine the presence of RBS 110.

In an embodiment, a TCP segment comprises information about RBS 110. The information may include a rotation rate with which RBS 110 is rotating, a reflector beam width, and any other data related to characteristics of RBS 110.

12.0 Angulation Discovery State

RBS 110 may be configured to probe tag computer 120 once per degree rotation for one full rotation of the RBS. For example, if RBS 110 is rotating 5 revolutions per second, then tag computer 120 may operate in an angulation discovery state for 0.2 seconds.

In an embodiment, RBS 110 probes tag computer 120 in one of two ways. In the first approach, RBS 110 transmits a UDP unicast datagram to the IP address of tag computer 120. The UDP datagram is sent to tag computer 120 embedded in an 802.11 frame. RBS 110 may also transmit a smaller 802.11 probe frame which contains no UDP datagram.

Upon receiving a UDP datagram (or 802.11 probe frame), tag computer 120 may respond with an 802.11 acknowledgement (ACK) frame. The ACK is an involuntary response mandated by the 802.11 standard. The ACK frame is typically sent within 60 microseconds after receiving the 802.11 probe frame or UDP unicast datagram. However, no ACK frame is generated or sent if tag computer determines that a checksum of the UDP datagram is incorrect.

Receiving an ACK frame from tag computer 120 by RBS 110 is referred to as discovering tag computer 120 by RBS 110. The process may be performed for each tag computer 120 in the network and by each RBS 110 in the network.

Upon receiving an ACK frame, RBS 110 may compute an angular direction of tag computer 120. This may be performed by computing the angles for the strongest RSSI received during the angulation discovery state.

In an embodiment, RBS 110 transmits information about the computed angular direction to tag computer 120. RBS 110 may also transmit information about a rotation rate of RBS 110 to tag computer 120.

Usually, an angulation discovery state places significant demands on resources used by a radio and a power supply. Because performing the angulation discovery state is taxing on the radio and the power supply, once RBS 110 discovers the presence of tag computer 120 in a computer network, RBS 110 usually switches to operating in a power and radio conservation mode.

13.0 Determining a Magnetic Heading

One of the benefits of RBS 110 is the strength of an oscillating signal generated by RBS 110. For example, RBS 110 may be configured to generate and transmit digitized packets (or frames) at a rate of hundreds or thousands of packets per second. The signal level of the packets received by other devices within a particular range may rise and fall as an antenna goes in and out of alignment with the device.

Figure 4:
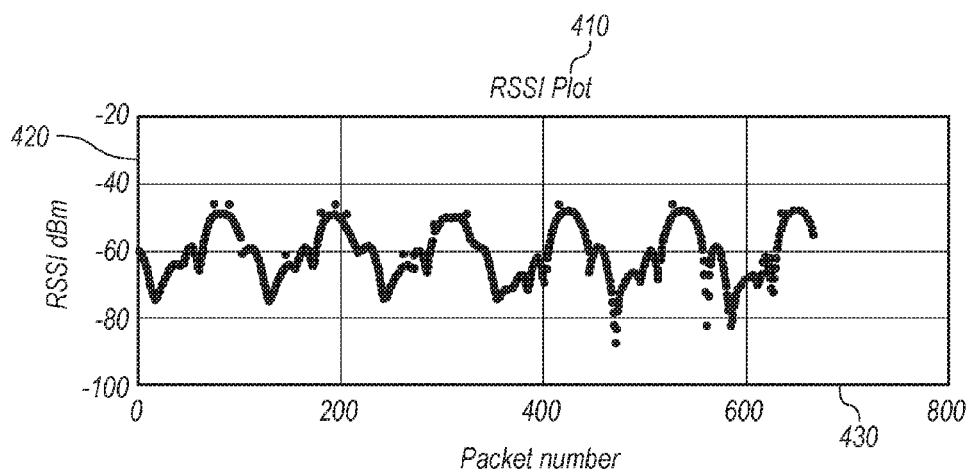
FIG. 4 is a screen snapshot of an exemplary plot of a signal strength indicator.

FIG. 4 is a screen snapshot of an exemplary plot of a signal strength indicator. A plot 410 shows data plotted from a stationary smartphone, and represents a packet signal strength of data received by the smartphone from a stationary prototype RBS 110. The packet signal strength is measured as a RSSI, and is depicted along a vertical axis 420. The packet numbers are depicted along a horizontal axis 430. Roughly 170 of the packets were broadcast every second by RBS 110, and were captured by the smartphone. The smartphone was configured to execute a software application that measured and plotted a RSSI against a packet number. The graph shows a very predictable and evenly spaced oscillation pattern. The pattern could be used by the smartphone to estimate a magnetic heading to RBS 110.

Plot 410 is an exemplary RSSI plot of a signal received by a smartphone from RBS 110. The RSSI peak strength indicates maximum alignment between an RBS reflector of RBS 110 and the smartphone. The packets with the highest dBm signal levels come from the most aligned RBS reflector.

To compute a magnetic heading of RBS 110 with respect to tag computer 120, tag computer 120 may execute an RBS client software application. Executing of the RBS client software application may cause storing the measured RSSI value and the corresponding data inside a data packet or a data frame. The packet/frame data may contain for example, a magnetic heading of PAR 12 of RBS 110 with respect to tag computer 120.

In an embodiment, executing an RBS client software application causes storing packets/frames received within the past second and waiting for a condition where the RSSI level drops by 6 dB from its highest peak. Then, the last quarter revolution of RBS 110 is considered, and used to find for example, the five packets that have the highest RSSI. In the next step, the heading values of the five packets having the strongest RSSI are averaged, and used as an estimate of the magnetic heading from RBS 110 to tag computer 120. The magnetic heading from tag computer 120 to RBS 110 may be computed by reversing the heading from RBS 110 to tag computer 120. Reversing the heading from RBS 110 to tag computer 120 may include adding 180 degrees to the heading from RBS 110 to tag computer 120. The resulting amount corresponds to the magnetic heading of tag computer 120 with respect to RBS 110. Any magnetic heading having a value above 360 degrees may be normalized by subtracting 360 degrees until the heading values is within a set=[0, 360].

14.0 Resources Conservation

Since each RBS 110 knows the location of each tag computer 120 in a computer network, it is not necessary to probe tag computers 120 when and antenna reflector of RBS 110 is out alignment with tag computer 120. For example, if PAR 12 has a reflected beam width of 10 degrees, it may be sufficient to probe each tag computer 120 during for example, a 20 degree arc when RBS 110 and tag computer 120 are aligned. The larger probe range acts as a buffer zone to accommodate and detect movements of tag computer 120. The 20 degree probe range may be centered at the angle of tag computer 120 already discovered by RBS 110.

In an embodiment, RBS 110 probes tag computer 120 once per degree or once per 4 degrees, depending on the accuracy requirements. This means that RBS 110 may probe tag computer 120 only 5 to 20 times per revolution. This may contribute to conserving resources of a radio and resources of a battery installed on RBS 110 and tag computer 120.

If tag computer 120 changes its location, then a new angle may be detected and the next probe arc may be determined based on the new angle.

Since each tag computer 120 also knows its own angle orientation in relation to each RBS 110, and knows a rotational rate of each RBS 110, each tag computer 120 can further reduce its power consumption by entering a sleep state when it does not expect receiving a probe from RBS 110. Tag computer 120 may be configured to determine when to exit its sleep state and enter a wake mode with respect to each RBS 110 individually.

In an embodiment, a state in which RBS 110 and/or tag computer 120 tries to conserve their respective resources is referred to as a power and radio conservation state. The power and radio conservation state may be maintained by the device indefinitely, or until a battery of the device is depleted from its charge, or until the device is shut down.

In an embodiment, if no probe from RBS 110 is received by tag computer 120, then tag computer 120 is configured to operate in a wake and listen mode to further reduce power consumption.

In an embodiment, RBS 110 does not probe tag computer 120 every revolution if rapid location updates are not required. RBS 110 can further conserve its power and radio resources if it skips some revolutions and only probes one arc per 5 seconds or 20 seconds. If RBS 110 probes only once per 10 seconds, then the probe frequency is defined as 0.1 hertz.

In an embodiment, RBS 110 generates information about an angle at which tag computer 120 was detected by RBS 110, and transmits the information to tag computer 120. RBS 120 may transmit a TCP segment including the information and having the IP address of tag computer 120. The TCP segment may be transmitted during the probe arc, and may contain the detected angle at which tag computer 120 was detected and the probe frequency with which tag computer 120 was detected.

A probe frequency with which RBS 110 transmits probes may change dynamically. For example, if tag computer 120 moves rapidly, then the probe frequency may be increased to improve a tracking precision. However, if tag computer 120 appears to move slow, then the probe frequency may be reduced to save the power and radio usage.

15.0 Multicomputer Data Transferring System with a Single Rotating Base Station

In an embodiment, a multicomputer data transferring system comprises a single RBS 110 and one or more tag computers 120. If a single RBS 110 is deployed, then tag computers 120 compute their own magnetic heading to RBS 110 and perform a range estimate to RBS 110 to estimate their own positions. In some applications, such as a camera tracking within the same plane, determining range estimates may not be necessary.

In a camera tracking application, a horizontal heading of a camera points toward tag computer 120. For example, if tag 120 is worn by a person, then horizontal heading to point the camera in the direction of tag computer 120 is sufficient because it is desired that RBS 110 be on the top or below the camera to avoid a parallax error. A camera tracking where the user is in a different elevation with respect to RBS 110 may involve determining a range estimate from RBS 110 to the user and a barometric reading for both RBS 110 and tag computer 120.

16.0 Multicomputer Data Transferring System with Multiple Rotating Base Stations In an embodiment, a multicomputer data transferring system comprises two or more RBSes 110 and one or more tag computers 120. If two or more RBSes 120 are deployed, then each tag computer 120 computes its own magnetic headings to two or more RBSes 120 to triangulate its own position. Furthermore, each of tag computers 120 may compute its barometric height with respect to a master RBS 110.

There might be at least two special cases where triangulation may be inaccurate. One special case includes situations in which tag computer 120 is lined up with two RBSes 110. Another special case includes situations in which tag computer 120 is too far away from a range of two RBSes 110. In such cases, a third RBS 110 that is aligned with tag computer 120 is selected, and used to assist tag devices 120 to determine their magnetic headings

17.0 Compass Calibration

In an embodiment, RBSes 110 are equipped with an internal compass. A compass may be integrated with base 1 of RBS 110. A compass may be used to provide a reference to the magnetic north.

In an embodiment, RBS 110 uses hall sensor 16 to measure magnet 17, associated with PAR 12, to compute the angle between PAR 12 and base 1. For example, if base 1 points 270 degrees westward, then the magnetic heading of PAR 12 is the angle between base 1 and PAR 12, plus 270 degrees. If the resulting sum is 360 degrees or more, then the resulting sum may be normalized by subtracting 360 degrees until the magnetic heading is a value in a range=[0, 359]. Once magnetic heading of RBS 110 is determined, information about the magnetic heading of RBS 110 (and therefore, the magnetic heading of PAR 12) is broadcast to a computer network.

In an embodiment, a compass is calibrated to ensure precise readings. A compass may be calibrated by determining an average value of sampling readings determined when BLDC motor 13 and PAR 12 remain stationary, and verifying the averaged value with an accelerometer reading installed on RBS 110. Once the compass is calibrated, the reading is stored in non-volatile flash memory of RBS 110. This means that the compass is not in use during an actual operation of RBS 110.

A calibrated, base magnetic heading reading may be stored in non-volatile flash memory. When RBS 110 is powered on, RBS 110 re-measures its magnetic heading using the magnetic compass. If the base magnetic heading reading stored in the flash memory is different than the re-measured magnetic heading, then that may indicate that RBS 110 was repositioned and may require a full recalibration of RBS 110; especially if RBS 110 is communicating with other RBSes 110, or it is operating in the Geographic Positioning Mode. If no full calibration is performed with respect to RBS 110, then RBS 110 may downgrade to a relative positioning mode.

During a normal operating state, a base magnetic heading is stored in a Random Access Memory (RAM) of RBS 110, or in a CPU cache if such is available. Information about the base magnetic heading is requested frequently (hundreds or thousands every second) when the magnetic heading of PAR 12 is requested.

18.0 Computing a Magnetic Heading

In an embodiment, a reflector angle relative to base 1 is only measured once per revolution when a magnet of RBS 110 passes hall sensor 16, and the angle between base 1 and hall sensor 16 is zero. The in-between angles of PAR 12 may be derived from the time elapsed since the magnet passed hall sensor 16. This time period is referred to as TSH. The reflector angle relative to base 1 is also a function of a rotating rate of PAR 12, measured in revolutions per second (RPS). Hence, a reflector angle relative to base 1 may be expressed using the following formula:

$$\text{Reflector Angle Relative to Base} = \text{TSH} * \text{RPS} * 360 \quad (1)$$

wherein TSH denotes the time-since-hall, and corresponds to the time period elapsing since the last time hall sensor 16 was triggered by the magnet, and wherein RPS denotes the revolution-per-second.

Typically, hall sensor is stationary as the magnet moves on the rotating PAR 12. RPS may be computed by inversing the difference between the last hall trigger time and the previous hall trigger time. For example, if it took 0.2 seconds from hall-to-hall, the inverse of 0.2 is 5, and therefore RPS is equal to 5.

Based on the two measurements, TSH and RPS, the direction of PAR 12 with respect to the RBS' base is computed. This may be illustrated using the following example: if it has been 0.1 seconds since the last time the hall sensor detected a magnet and reported it to a computer of RBS 110, then the RPS is 5 (5 reflector rotations per second). If it takes 0.2 seconds for one full rotation, then that means that 0.1 seconds corresponds to a half of the rotation, or 180 degrees. This may be verified as shown below:

$$\text{Reflector angle relative to Base} = (\text{TSH}=0.1) * (\text{RPS}=5) * 360 \quad (2)$$

Continuing with the example, the reflector angle relative to the RBS' base will be 0.1*5*360=180.

A reflector magnetic heading may be expressed using the following formula:

$$\text{Reflector Magnetic Heading} = (\text{Reflector Relative Angle to Base} + \text{Base Magnetic Heading}) \bmod 360. \quad (3)$$

Computing a reflector magnetic heading using formula (3) is rather straightforward. A more precise method with a higher component cost may implement a rotary encoder with magnet. The rotary encoder also enables other capabilities and applications.

19.0 Relative Positioning Mode

Figure 5:
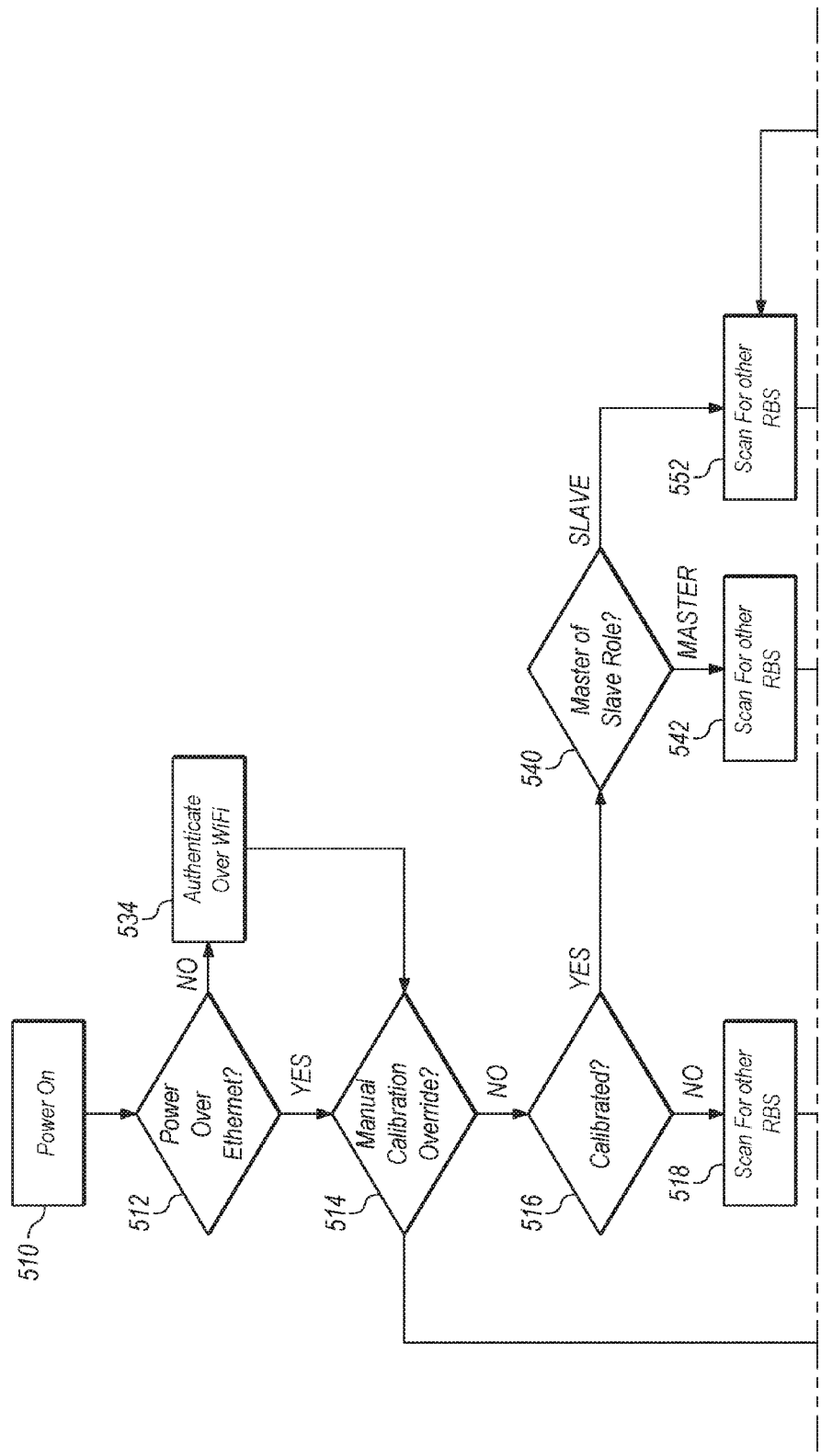
FIG. 5 depicts a process for determining a location of a tag computer with respect to a rotating base station.
Figure 5:
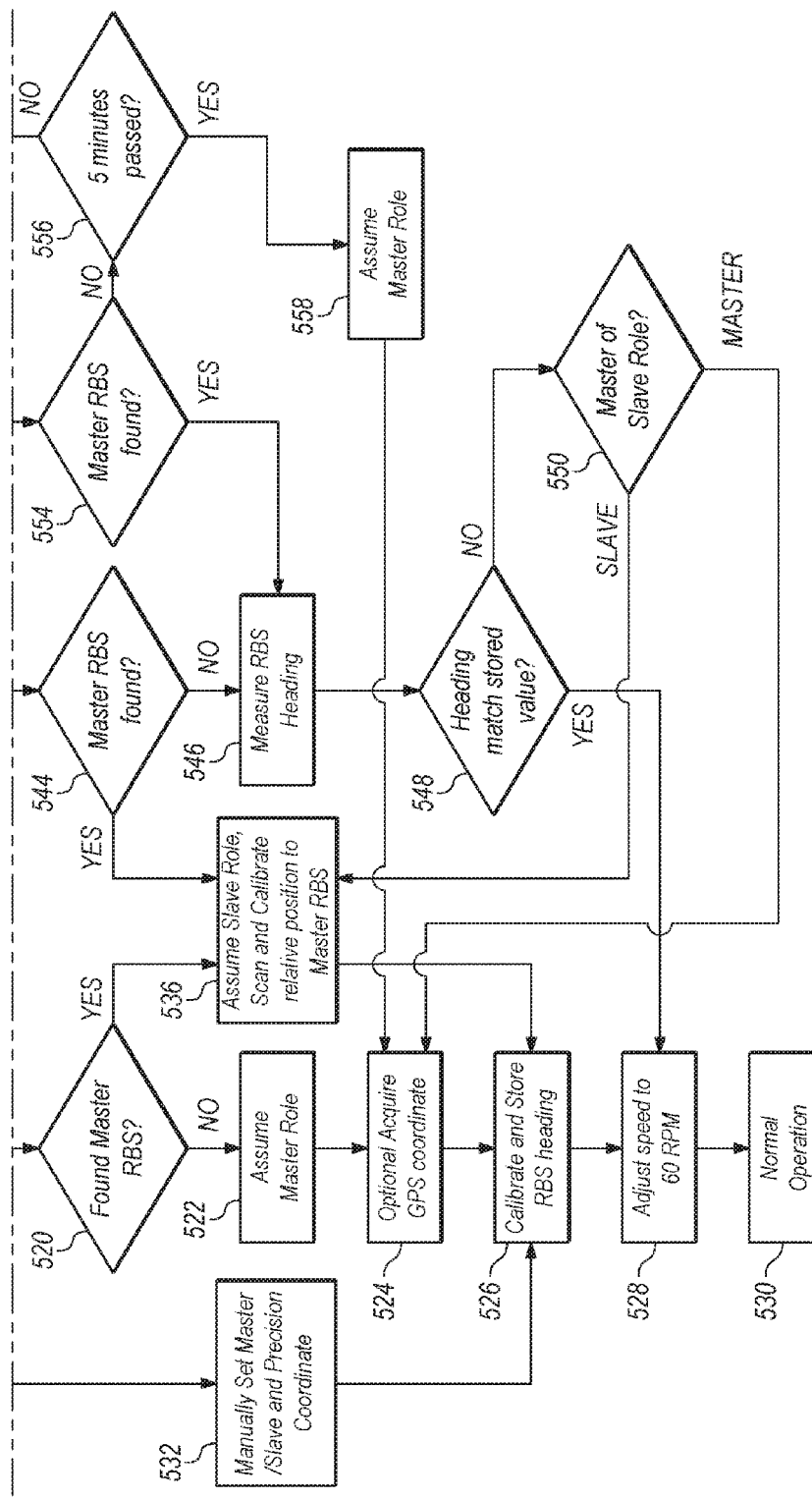

FIG. 5 depicts a process for determining a location of a tag computer with respect to a rotating base station. A process for determining a location of tag computer 120 with respect to RBS 110 may be performed by RBS 110 operating in a relative positioning mode.

A relative positioning mode is a default positioning mode of RBS 110. In this state, RBS 110 is configured to determine location information in reference to the location of RBS 110, not with respect to the absolute geographical location coordinates.

In step 510, a first RBS is powered on. The first RBS that comes online elects itself to be a master RBS and it will have a Cartesian x, y, and z coordinates of 0, 0, and 0. The master RBS may periodically broadcast over radio that it is the master RBS and that it operates in Relative Positioning Mode.

Subsequent RBSes that come online become slave RBSes of the master RBS with the same RBS Identifier (RBSID). All RBSes may use their own inertial measurement unit (IMU) 15 to compute and broadcast their own readings of their barometric pressure. Slave RBSes may then compare their own barometric pressures to estimate their height difference to the master RBS. Some slave RBSes, such as tablets, laptops, outdated smartphones, or RBS-Tags that lack barometers, may only be able to operate in X-Y mode without the ability to compute their own Altitude.

In step 512, a test is performed if an RBS was powered over the Ethernet. If so, step 514 is performed. Otherwise, step 534 is performed, in which the RBS authenticates itself to a Wi-Fi network over a Wi-Fi connection.

In step 514, a test is performed to determine whether to perform a manual calibration of the RBS. If a manual calibration of the RBS is to be performed, then step 532 is performed, in which the RBS is manually calibrated with precision coordinates, and step 526 is performed. Otherwise, step 516 is performed.

In step 516, a test is performed to determine whether the RBS is already calibrated. If so, then step 540 is performed. Otherwise, step 518 is performed, in which a scan for other RBSes is performed, and if in step 520, it is determined that a master RBS is found, then, in step 536, the RBS is assigned a slave role, the RBS is calibrated relatively to the position of the master RBS, and step 526 is performed.

However, if in step 520 it is determined that no master RBS was found, then, in step 522, the RBS assumes a role of the master RBS, and in step 524, the RBS acquires (optionally) GPS coordinates, and step 526 is performed.

In step 540, a test is performed to determine whether the RBS is a master RBS or a slave RBS. If the RBS is a master RBS, then step 542 is performed, in which a scan is performed for other RBSes, and if in step 544 another master RBS is found, then step 536 is performed. However, if no master RBS was found in step 544, then in step 546, the RBS measures its heading, and tests, in step 548, whether the measured heading matches the pre-stored base magnetic heading value. If it does, then step 528 is performed. Otherwise, step 550 is performed, in which a test is performed whether the RBS is a master. If it is, then step 524 is performed. If it is not, then step 536 is performed.

If, in step 540, it was determined that the RBS is a slave, then step 552 is performed.

In step 552, a scan is performed for other RBSes. If, in step 554, a master RBS is found, then step 546 is performed. However, if, in step 554, no master RBS was found, then in step 556, a test is performed whether a certain amount of time, such as 5 minutes, has elapsed since the RBS was powered on. If not, then step 552 is performed. Otherwise, step 558 is performed.

In step 558, the RBS is assigned a role of a master RBS, and step 534 is performed.

In step 524, the RBS acquires (optionally) the GPS coordinates.

In step 526, a magnetic heading of the RBS is calibrated and stored.

In step 528, a speed with which PAR 12 rotates is adjusted to a certain value. For example, the speed may be adjusted to 60 RPM.

In step 530, the RBS starts its normal operation, which may include generating and transmitting probes to other devices, discovering other devices, and/or receiving magnetic heading information from other devices.

In an embodiment, all slave RBSes synchronize their clocks with a master RBS. The synchronization may include synchronizing the clocks at a known distance and adding the expected time delay due to that known distance.

In an embodiment, RBSes at startup scan around the horizon at a slower than normal rotation rate to determine whether there are any master RBSes already operating nearby that have matching RBSID. If a matching master RBS is found, then the RBS assumes a role of a slave, and aligns its PAR 12 to point towards the master RBS to be able to receive RSSI communications transmitted by the master, and to find its own magnetic heading with respect to the master RBS.

In an embodiment, a slave RBS uses a timestamp delay to find its distance to the master RBS. The slave RBS may initiate a rotation of its PAR 12 until PAR 12 reaches its normal operating Revolutions per Minute (RPM). Then, the slave RBS may start broadcasting its own relative position.

In an embodiment, if a slave RBS is located within for example, 50 meters to the left of a master RBS and it has a barometric pressure that is for example, one meter higher than the master RBS, then the RBS broadcasts its own Cartesian position as −50, 0, and 1.

If a master RBS is in an offline mode, then another RBS that came online make take over the role of the master RBS. That RBS may maintain the original coordinate system derived from the original master RBS. Additional slave RBSes may also maintain their coordinates derived from the original master RBS. This enables redundancy and fault tolerance of the implemented positioning system, and can be used to enhance the RBS' installation process.

In an embodiment, a temporary master RBS is deployed at the center of a building during an installation process to reduce a distance and angular measurement error. Subsequently, one or more permanent RBSes may be deployed at the edges and corners of the building. By obtaining their location information from the centrally positioned, temporary RBS, the permanent RBSes may benefit from the relatively precise reference coordinates. Once the calibration of the permanent RBSes is completed, the temporary master RBS may be removed. Once the temporary master RBS is removed, a second RBS that comes online may assume the role of a master.

If a high-level positioning accuracy is desired, then the installation of the RBSes may be performed and verified using the surveying equipment to measure the position of each slave RBS with relation to the master RBS. Then, using an RBS configuration software application, the precise locations of the slave RBSes may be input to the configuration modules of the slaves.

20.0 Geographic Positioning Mode

In an embodiment, RBS 110 is configured to operate in a geographic positioning mode (GPM). To operate in the GPM, a geographic position of a master RBS is obtained and provided to the master RBS. The geographic position data may include a longitude, a latitude, an altitude, and a compass heading of the master RBS. The geographic position may be provided to the master RBS by executing an RBS configuration software application on the RBS during an initial installation of the RBS. The master RBS configuration may be stored in non-volatile flash memory.

In an embodiment, geographic position data is obtained from a Global Positioning System (GPS) using any type of device configured to communicate with the GPS and to receive the GPS data. The GPS data may be acquired using for example, a smartphone, and communicated to an RBS configuration software application executed on an RBS. The RBS configuration software application may use the provided GPS data and the smartphone's relative position with respect to the RBS to compute the GPS position of the master RBS.

Once a master RBS is configured with its own GPS coordinates, the master RBS may periodically broadcast over radio that it is the master RBS. The master RBS may also broadcast its own GPS coordinates. That information may be used by a slave RBS to compute its own relative position with respect to the master RBS.

In an embodiment, GPS information is captured by a highly precise instrument. For example, the GPS information may provide a resolution measured in centimeters. If such a high resolution GPS data is available, then each RBS may be manually reconfigured using the high resolution data. For indoor applications, the installer may use precision surveying equipment to perform the measurements and calibration. The outdoor installer may bypass the surveying equipment if they can get close enough to the indoor RBS to estimate a precise distance and heading to the RBS. The installer may also estimate the positions of the RBS units if they have a precise floor map to reference.

21.0 Security and Encryption

Security considerations may be important in a multicomputer data transferring system in which tag devices are carried by humans or animals. Most of conventional systems for tracking other devices do not implement security mechanisms. For example, the GPS has no security, and thus, GPS data may be intercepted by malicious persons by spoofing GPS signals. Since it has become trivially easy to spoof GPS signals using low cost, software-defined radios, security breaches in systems deployed in airplanes, ships, and drones became concerning.

In an embodiment, RBS 110 is a secure positioning system that supports a secure administration, a secure operation, and a secure positioning broadcast between RBS 110 and tag computers 120.

In an embodiment, security mechanisms of RBS 110 are implemented using the NSA Suite B cryptographic algorithms.

21.1 Example X.509 Certificate

In an embodiment, RBS 110 implements the standard DSA or Elliptic Curve ECDSA X.509 certificates. An X.509 certificate may be acquired from a commercial Certificate Authority, a private Certificate Authority, or others. The certificate enables secure SSH console access, secure HTTPS web access, and digital signatures for the broadcast packets to ensure that the positioning system is resistant to malicious acts.

In an embodiment, a manufacturer of RBS 110 offers signing services of a Certificate Authority during a product registration. During the registration, a unique RBS identifier (RBSID) may be obtained. The RBSID may be associated with a customer's email address. A customer needs to be verified by an email round-trip verification process.

A unique RBSID is usually up to 14 alpha-numeric-character-long. If a customer wishes to use their official ICANN domain name as their RBSID, then the customer needs to verify his ownership of that domain through a round-trip verification process with that domain's administrator email address.

In an embodiment, tag computers 120, including RBS-Tags, are configured to trust the RBS manufacturer's Certificate Authority as well as common commercial Certificate Authorities. Customers may initially add an RBSID to the Trust List of any RBS client device. This initial setup may be critical to the security of the multicomputer data transferring positioning system. Each device included in the positioning system that is connected to a secured RBS may display on its display screen a Lock Symbol that indicates that the device is operating in a secure mode.

21.2 Asymmetric Encryption Mode

In an embodiment, RBS 110 uses a broadcast architecture that may support hundreds to millions of devices. One example implementation of the RBS may include an implementation that uses the 802.11 Wireless LAN protocol and Bluetooth Low Energy (BLE) protocol to broadcasts hundreds to thousands of communications (datagrams, frames, packets) per second. Broadcast communications are communications that do not contain any specific address destination; therefore, they may be processed by any device that receives such packets.

Most of broadcast communications cannot be cryptographically signed due to hardware limitations. Even if the computational load can be handled by RBS 110, it is impractical to verify the cryptographic signatures of hundreds or thousands of packets by tag computers 120. One of the practical solutions is to only sign a small fraction of the communications depending on the required level of security and/or hardware capability. The cryptographically signed packets are called the Key Packets, while the unsigned packets are called the Intra Packets.

In an embodiment, PAR 12 of RBS 110 has a directional design. A directional design of the RBS' PAR 12 means that tag computer 120 may be unable to receive many communications transmitted by RBS 110 because such communications are out of alignment with PAR 12. Small in size PAR 12 may transmit communications to tag computer 120, and tag computer 120 may receive those communications if they are within a field of view of for example, 100 degrees. In contrast, large in size PAR 12 may transmit communications to tag computer 120, and tag computer 120 may receive those communications if they are within a field of view of for example, 5 degrees. The field of view may be referred to as a sector.

In an embodiment, tag computer 120 is configured to receive a fraction of intra packets sent from the aligned PAR of RBS 110. Sparse Key Packets may not be received by tag computer 120 unless RBS 110 transmitted at least one Key Packet per sector. If there are fewer Key Packets than sectors, then RBS 110 may be expected to alternate the Key Packets among the sectors so that tag computers 120 will at minimum receive one Key Packet every few seconds. Some tag computers 120 that are located relatively close to RBS 110 may receive multiple Key Packets per second; however, to reduce processing loads, those tag computers may opt to verify only a fraction of the received Key Packets.

In an embodiment, several different types of Key Packets are used. The different types may include for example, a Key-RBSID packet, a Key-Data packet, and a Key-Signature packet. A Key-Signature packet may be split into two packets due to Bluetooth Low Energy (BLE) packet size limits. A Key-RBSID packet may contain a 14-byte-long RBSID. A Key-Data packet is unencrypted and may contain the RBS coordinates, RBS barometric pressure, magnetic heading of the RBS' PAR 12, a master RBS Flag Boolean bit, a Geographic Positioning Flag Boolean bit, an RBS Spoofing Alert Boolean Bit, and an RBS timestamp.

Figure 6A:
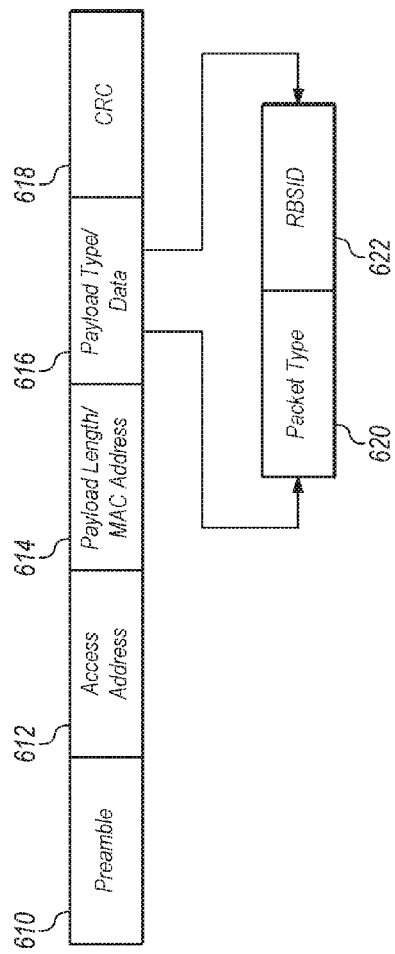
FIG. 6A-6G depict examples of packet structures generated by a rotating base station.

FIGS. 6A-6G depict examples of packet structures generated by a rotating base station. In particular, FIG. 6A depicts a Key-RBSID Packet, which includes a preamble 610, an access address 612, a payload length/MAC address 614, a payload type/data 616, and a CRC 618. Payload type/data 616 may include a packet type 620 and an RBSID 622.

Figure 6B:
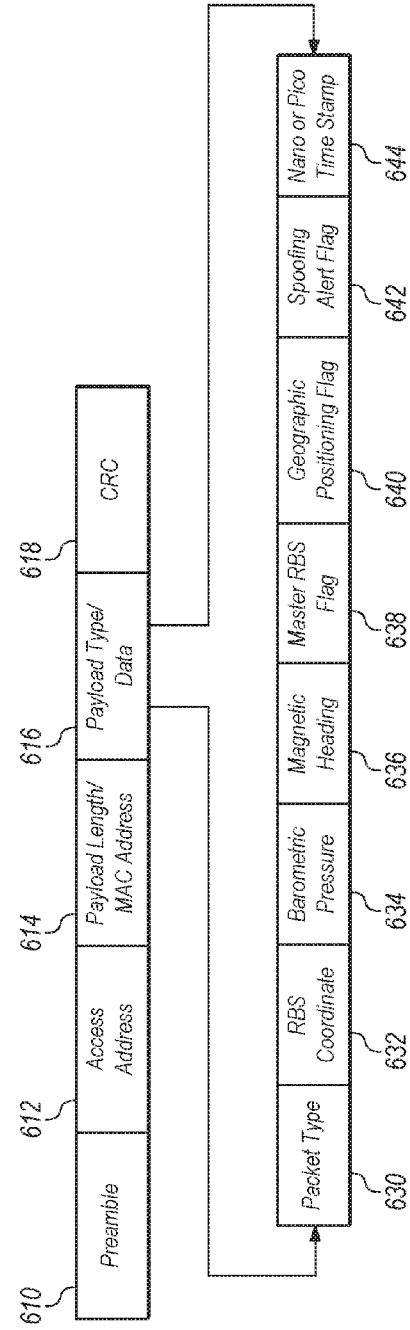

FIG. 6B depicts a Key-Data Packet, which includes a preamble 610, an access address 612, a payload length/MAC address 614, a payload type/data 616, and a CRC 618. Payload type/data 616 may include a packet type 630, an RBS coordinate 632, a barometric pressure 634, a magnetic heading 636, a master RBS flag 638, a geographic positioning flag 640, a spoofing alert flag 642, and a nano or pico time stamp 644.

In an embodiment, a Key-Signature Packet contains an ECDSA Digital Signature of the entire payload within the Key-RBSID and a Key-Data Packet. The Signature may be generated from an SHA-1 160-bit or SHA-2 224-bit hash of the Data Packet. The hash may be then cryptographically signed using a 160-bit or 224-bit ECDSA signing function.

Figure 6C:
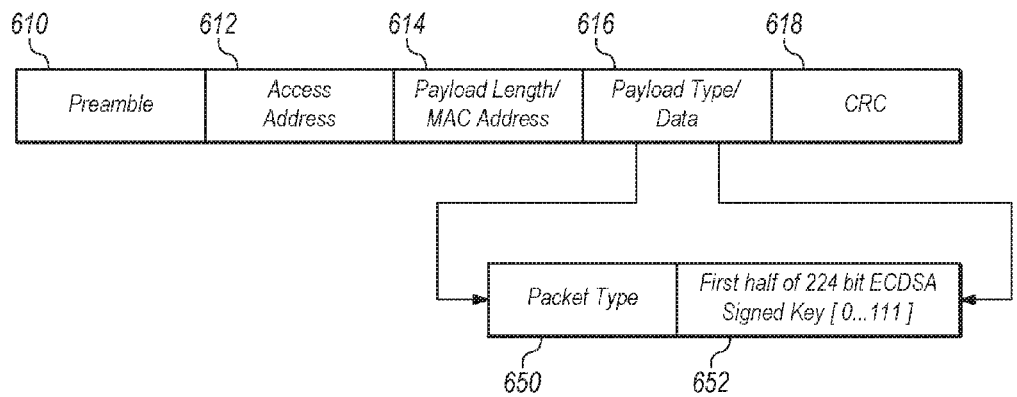
Figure 6D:
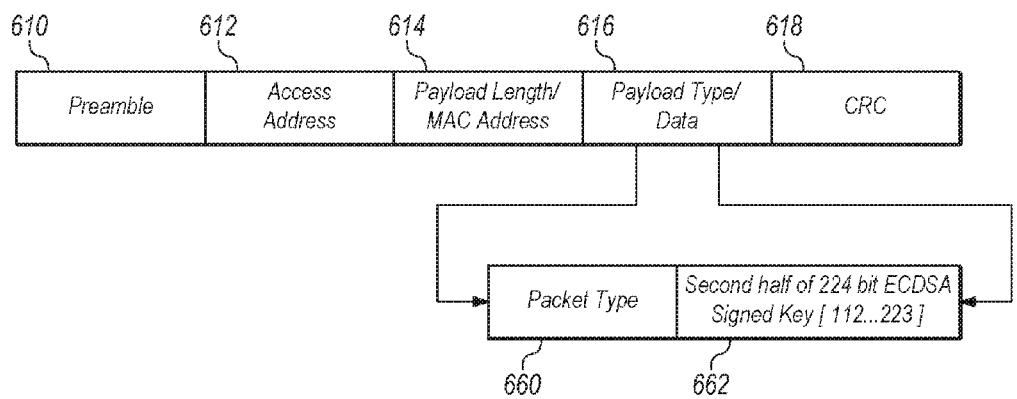

FIG. 6C depicts a Key-Signature-Part1 Packet, while FIG. 6D depicts a Key-Signature-Part2 Packet. The Key-Signature-Part1 Packet includes a preamble 610, an access address 612, a payload length/MAC address 614, a payload type/data 616, and a CRC 618. Payload type/data 616 may include a packet type 650 and a first half of 224 bit ECDSA signed key 652.

FIG. 6D depicts a Key-Signature-Part2 Packet, which includes a preamble 610, an access address 612, a payload length/MAC address 614, a payload type/data 616, and a CRC 618. Payload type/data 616 may include a packet type 660 and a second half of 224 bit ECDSA signed key 662.

Figure 6E:
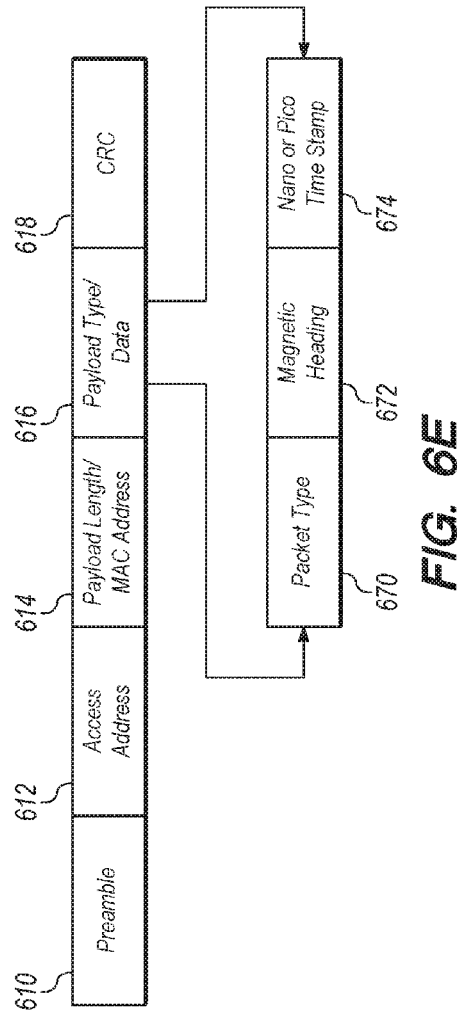

FIG. 6E depicts an Intra Packet, which includes a preamble 610, an access address 612, a payload length/MAC address 614, a payload type/data 616, and a CRC 618. Payload type/data 616 may include a packet type 670, a magnetic heading 672 and a nano or pico timestamp 674.

Intra Packets usually contain only timestamp information and a magnetic heading of an RBS. While it is possible for malicious people to spoof the Intra Packets, the degree of damage they can do is limited. For example, it may not be possible to pull a device off course beyond the radio coverage area of the RBS.

Any packet spoofing will likely be detectable by the RBS when the RBS transmits a Spoofing Alert in the next Data Key Packet with the RBS Spoof Boolean Bit set to 1.

21.3 Symmetric Encryption Mode

In an embodiment, a multicomputer data transferring system operates in a symmetric encryption mode. Symmetric encryption mode is applicable to situations in which devices of the multicomputer data transferring system are incapable of supporting an asymmetric cryptography mode in real-time, and therefore are incapable of supporting Key Packets signed using DSA or ECDSA.

A symmetric encryption mode is widely implemented. In fact, even low performance 802.11 Wi-Fi SoC or BLE SoC solutions support the symmetric encryption mode in hardware without any performance penalty. Another benefit of implementing a symmetric encryption mode is that an RBS can support 128 bit AES symmetric encryption of both Key Packets and Intra Packets. The downside to the symmetric encryption mode is that the mode is not nearly scalable as the asymmetric cryptography mode. An example of a symmetric encryption mode is an AES symmetric encryption mode. In an AES symmetric encryption mode, each client device that uses the RBS operates on a pre-configured AES key set up on the Client Device and the RBS.

In a symmetric encryption mode, an RBS uses an AES encrypted variant of the Key Packet and Intra Packet. The Key Packet may be split into a Key-RBSID Packet and a Key-Data-AES Packet.

Figure 6F:
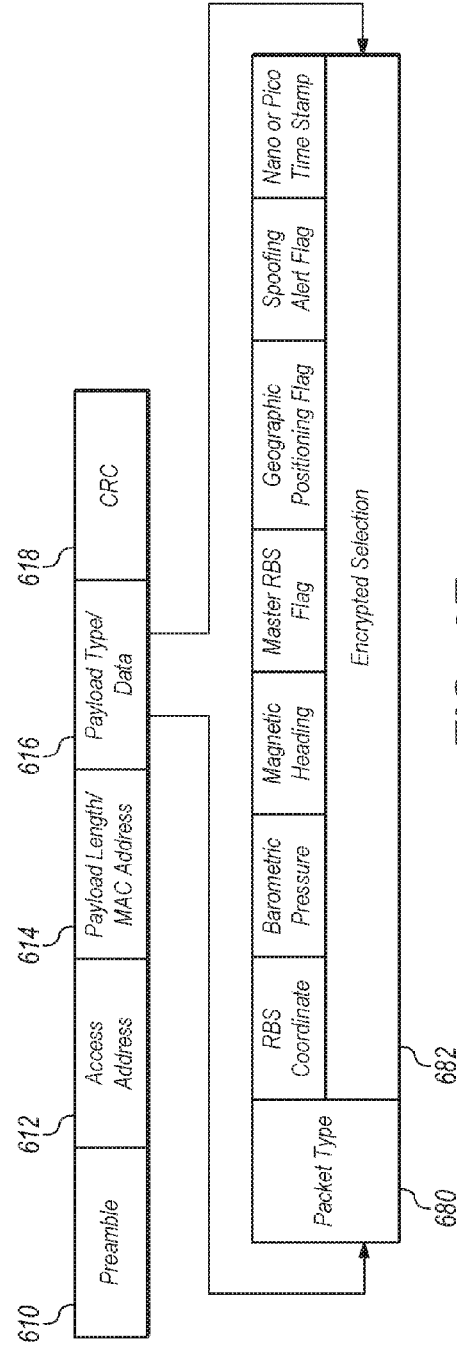

FIG. 6F depicts a Key-Data-AES Packet, which is unencrypted, and includes a preamble 610, an access address 612, a payload length/MAC address 614, a payload type/data 616, and a CRC 618. Payload type/data 616 may include a packet type 680, an RBS coordinate, a barometric pressure, a magnetic heading, a master RBS flag, a geographic positioning flag, a spoofing alert flag, a nano or pico time stamp, and an encrypted section 682.

Figure 6G:
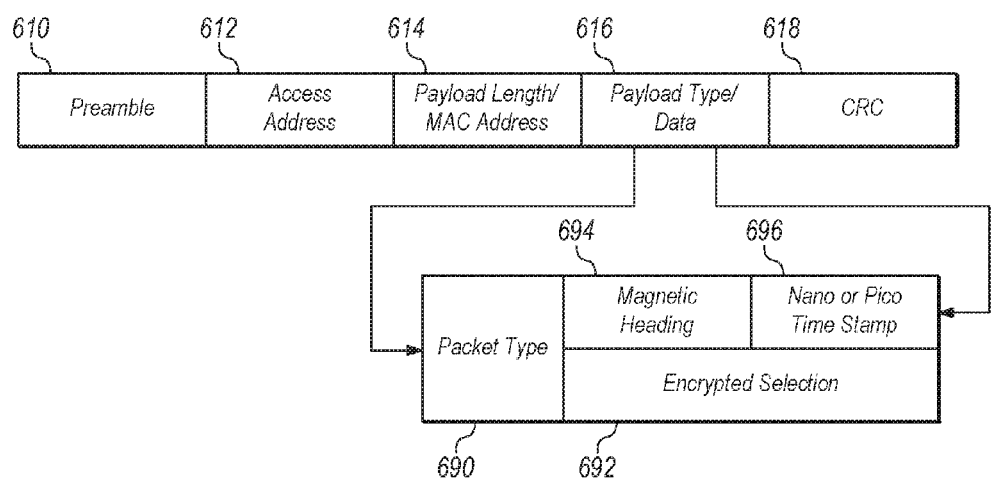
Figure 7:
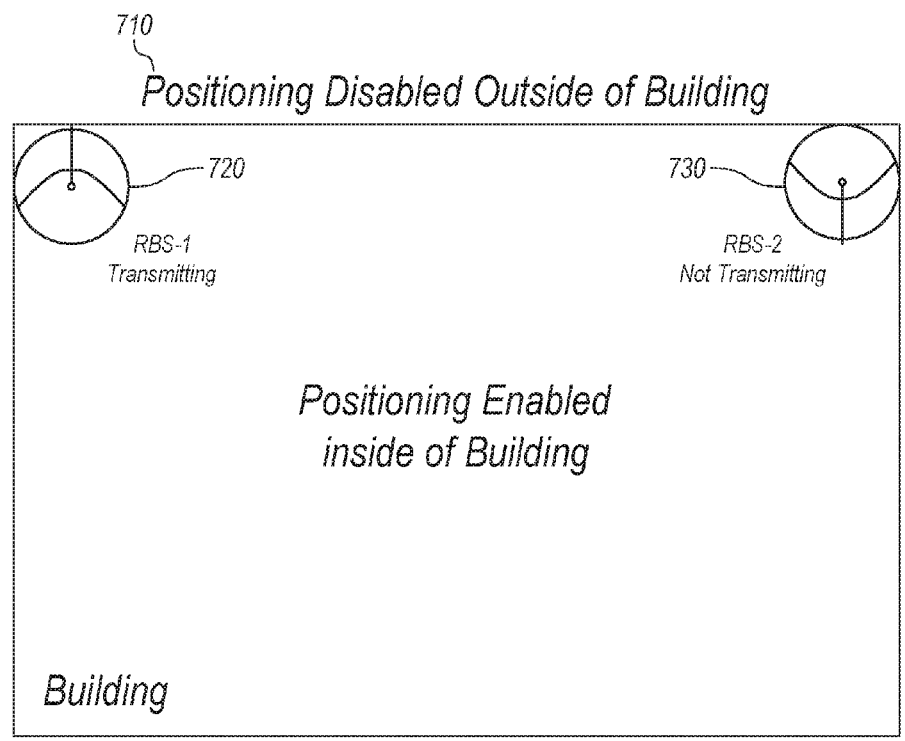
FIG. 7 depicts an exemplary operation where positioning information is enabled only inside of a building and disabled outside of the building.

FIG. 6G depicts an Intra-AES Packet, which includes a preamble 610, an access address 612, a payload length/MAC address 614, a payload type/data 616, and a CRC 618. Payload type/data 616 may include a packet type 690, a magnetic heading 694, a nano or pico time stamp 696, and an encrypted section 692.

Client devices that know a secret AES encryption key may be able to decrypt the Key-Data-AES Packet and verify that it is from a trusted RBS. Client devices may share the same AES key, but an RBS may support more than one AES key to encrypt the Key-Data-AES Packet so that the client devices can have a unique key. Each AES key may have its own encrypted copy of the Key-Data-AES Packet.

Due to a limited capacity of radio devices, there is usually a limit on the count of AES keys, and therefore, there is usually a limit on the count of unique Key-Data-AES Packets.

In an embodiment, an RBS configured to operate in a symmetric encryption mode may also be configured to encrypt an Intra Packet using a separate AES key, but usually not multiple AES keys. Since it is rather impractical to multiply hundreds or thousands of Intra Packets broadcast every second, client devices usually use the same shared key to decrypt Intra Packets.

21.4 Packet Type Headers

In an embodiment, a packet type of a packet is encoded using a code, and the code is embedded in a header of the packet. Upon receiving a packet, a client device parses the header of the packet, identifies the code, and based on the code determines the packet type of the packet.

Coding of a packet type depends on the type of encryption mode implemented in a multicomputer data transferring system.

21.4.1 Packet Types in Asymmetric Encryption Modes

Table 1 below depicts examples of codes corresponding to various types of packets used in an asymmetric encryption mode:

| Packet Type | Packet Type Code |
| --- | --- |
| Key-RBSID | 11110000 |
| Key-Data | 11110001 |
| Key-Signature-1 | 11110010 |
| Key-Signature-2 | 11110011 |
| Intra Packet | 11110100 |

Table 1 depicts examples of codes corresponding to various types of packets used in an asymmetric encryption mode.

21.4.2 Packet Types in Symmetric Encryption Modes

Table 2 below depicts examples of codes corresponding to various types of packets used in a symmetric encryption mode:

| Packet Type | Packet Type Code |
| --- | --- |
| Key-RBSID | 11110000 |
| Key-Data-AES | 11110101 |
| Intra-AES | 11110110 |

Table 2 depicts examples of codes corresponding to various types of packets used in a symmetric encryption mode.

Table 3 below depicts an example of a code corresponding to a wake packet type:

| Packet Type | Packet Type Code |
| --- | --- |
| Wake | 11110111 |

Table 3 depicts an example of a code corresponding to a wake packet type.

22.0 Unsecured Multicomputer Data Transferring System

Unsecured RBS operation is usually an optional implementation of RBS 110. If supported, an RBS and RBS client devices may operate without any X.509 certificates or AES security mechanisms. Each RBS may still be configured using an RBS configuration software application in a moderately secure environment via wired Ethernet network or a secure 802.11 Wireless LAN. Each RBS can also be set up with an unsecured and unverified RBSID. The unverified RBSIDes may work with RBS client devices configured to operate in an unsecured mode, and a notification that the security mechanisms are disabled may be provided to users.

23.0 Inter-Stations Communications and Pairing

In an embodiment, an RBS architecture supports a single RBS mode and/or a multiple RBS operating mode. When multiple RBS devices are owned and operated by a single customer, the customer may register each of the RBS devices with the RBS' manufacture. Therefore, each RBS that the customer owns may be configured with the same unique and verified RBSID, and may be paired with each other RBS. Each RBS may be configured with an X.509 certificate and be able to communicate securely with each other RBS using the Transport Layer Security (TLS) protocol and using the X.509 certificates to facilitate a secure key exchange and encrypted communications.

When a slave RBS comes online and detects a master RBS, and both the slave and the master have the same RBSID, the slave RBS may establish a secure TLS tunnel with the master RBS. A detection process may first take place over a wired Ethernet connection and then over the 802.11 wireless protocol. All subsequent communications between the paired RBS units may use the TLS tunnel to ensure the operational integrity.

A group of RBS units owned and operated by one entity may be configured to operate in conjunction with another RBS or another group of RBS units owned by another entity. The collaboration may cause an improvement to the coverage area and accuracy of the positioning system. To operate in a secure positioning mode, each owner may sign a X.509 certificate along with their own unique and verified RBSID. The owners can exchange RBSIDes and configure their own master RBSes to trust the other owner's RBSID. The slave RBS units may inherit any RBSID added to their master RBS' Trust List. RBS client devices may also inherit their master RBS' RBSID Trust List. Pairing may be implemented in an unsecured mode with no security if both sides enable the unsecured mode.

24.0 Synchronization of a Rotating Base Station

If more than one RBS is employed, a tag computer may receive a large number of packets from the RBS units. To reduce the packet traffic, operations of the RBS units may be synchronized and/or alternated. For example, a master RBS may coordinate the RPM and a magnetic heading of each slave RBS. In an arrangement with two RBSes, one RBS may be configured to transmit communications over a 180 degree arc, while another RBS may be configured to transmit communications in the opposite direction. As the first RBS rotates away from a client device, the second RBS may be aligned toward the client device and may begin to transmit over a 180 degree arc. In this configuration, the coverage area may support one side of the two RBS units. With four RBS units installed in the corners of a rectangular building or a rectangular region, each RBS may be 90 degree out of phase and each may only transmit data over a 90 degree arc.

FIG. 5 depicts an exemplary operation where positioning information is enabled only inside of a building and disabled outside of the building. The depicted example shows an RBS-1 720 that transmits beacons, and an RBS-2 730 that does not transmit beacons. Both RBS units are installed in a building.

To estimate a range for an RBS, a distance between the RBS to a client device may be determined by measuring the maximum RSSI value of the packets transmitted from the RBS to the client device. Because the RSSI drops 6 dB for every doubling of the distance, the distance between the RBS and the client device may be approximated. This range estimation method is quick and easy but the range error may grow with a rate of the square of the distance. Therefore, this estimation method is recommended for short distances.

An estimation method based on an RSSI may be susceptible to an error when a physical obstruction attenuates a radio signal. However, the physical obstruction affects are usually temporary. Thus, most likely, there will be some packets that are unobstructed and have unaltered RSSI values. The obstruction-based error may be mitigated by measuring and using the maximum RSSI value. Most existing products that use RSSI range estimates often use RSSI averaging.

25.0 Calculation a Range with Packet Flight Time

A more accurate way to estimate a range is to measure the time it takes packets to travel from an RBS to a client device. For client devices that have RBS software installed, for packets coming from the RBS a direct one-way latency measurement may be taken. The client device is usually time-synchronized to a master RBS at a known distance and adjusted for the expected time delay due to the known distance. The client device may be configured to calculate its distance to the master RBS or a slave RBS by measuring the delay in the timestamp in the packets coming from the RBS units. Since packets traveling at the speed of light may traverse one meter in 3.34 nanoseconds, the timestamp delay divided by 3.34 nanoseconds may be used to determine how many meters are between the client device and the RBS.

In situations in which, due to hardware insufficiency, a client device is not configured to support a nanosecond precision time, a range from an RBS to a client device may be estimated using a roundtrip method. The RBS can send a reply-request packet to the client device to ask for a reply. The time difference between the moment in which the RBS transmits the packet and the moment in which the RBS receives the response packet is known as a total round trip time. The processing delay time on the client device may be estimated at a known distance from the RBS after subtracting the expected roundtrip flight time. Subtracting the processing delay time from the total round trip time yields the total roundtrip flight time. A half of that yields the one-way packet flight time. The round trip time is usually measured several times to average a random variation in the client device's processing delay time. The one-way packet flight time may be divided by 3.34 nanoseconds to determine how many meters are between the client device and the RBS.

26.0 Supporting Client Device with No RBS Client Software

In an embodiment, client devices, such as smartphones, tablets, and/or other computer devices are not configured with an RBS client software application. Such devices, therefore, may be unable to capture and analyze broadcasts transmitted by an RBS. Some of the devices may be analog radio devices that have no facility to execute software applications. Some other devices may be operated by malicious users trying to infiltrate a wireless network utilized by the RBS.

To support such client devices, an RBS may be configured to ping the devices and expect receiving a response over the 802.11 wireless network. Before that can happen, the client devices are expected to join the same 802.11 network. The usual way to facilitate that is to offer a wireless hotspot with which the client devices may establish communications connections. Once connected, a client device may usually be redirected to a hotspot portal webpage. The hotspot portal may offer a positioning map hyperlink or a button configured to direct the client device to the RBS Web portal. The RBS Web portal may be executed on a master RBS.

The RBS Web portal may provide hyperlinks to a client device software application. A user may use the hyperlinks to download and install the application onto a client device.

However, even if a user of a client device declines to install the RBS client software application, an RBS may still support such a client device in a ping-reply mode. The RBS may steadily ping each of the client devices and receive a steady stream of replies from the client devices over the 802.11 wireless network. However, that may cause a traffic flood in the 802.11 network. A solution to that may be configuring the RBS to ping a specific client device when its parabolic antenna reflector is approximately aimed at the specific client device. When the RBS determines a magnetic heading of each client device, it can reduce the ping transmissions to a 5 to 100 degree sector centered to the magnetic heading of the client device. The sector size may depend on the reflector size. Larger reflectors may use small sectors while smaller reflectors may need larger sectors.

In an embodiment, an RBS measures an RSSI strength of the reply packets received from a client device and compares the measured RSSI strength values to a magnetic heading of its own rotating PAR 12. To compute a magnetic heading from the RBS to the client device, the RBS may store packets received within the past second, or so, and wait for a condition where the RSSI level to drops 6 dB from its highest peak. Then, the RBS may take a last quarter revolution of the RBS reflector and find for example, five packets with the highest RSSI value. Averaging the magnetic headings of the five strongest RSSI packets may yield a good estimate of the magnetic heading from the RBS to the client device.

27.0 Wireless Intrusion Detection Mode

In an embodiment, a multicomputer data transferring system supports a wireless intrusion detection. Supporting a wireless intrusion detection allows detecting situations in which a wireless device of a malicious entity attempts to connect to a wireless LAN and attempts to ping RBSes and/or tag computers.

Supporting a wireless intrusion detection may include capturing and measuring an RSSI opportunistically each time when a malicious wireless device transmits data. A malicious wireless device usually transmits or injects forged packets to a wireless network to attempt to terminate communications connections between legitimate devices and the wireless network, and subsequently attack these devices with for example, an "Evil Twin" wireless network that purports to be a legitimate wireless network. Opportunistic capture and measurement may likely have the slowest refresh rate for positioning data because the packets coming in may be sparse. But over the course of multiple seconds, minutes, or hours, it can detect and locate at least some wireless threats.

28.0 Analog Radio Detection Mode

Detection of analog devices may be performed using an approach similar to the approach for a wireless intrusion detection mode; however, an implementation of the approach may involve including in an RBS an additional software defined radio (SDR) transceiver 10 to capture the radio signals.

In an embodiment, an RBS measures RSSI signal levels of incoming radio signals; however, no Bluetooth Device Address or 802.11 MAC address is used to uniquely identify the radio signals. The RBS computer may identify signal patterns and frequencies and assign a radio signature as a unique Radio Device ID (RDID).

An RDID may be measured a few hundred or thousand times per second in even increments of time and each sample may include an RSSI measurement. The hundreds or thousands of RDID samples may then be stored along with information about a magnetic heading of PAR 12.

In an embodiment, a magnetic heading from an RBS to an analog device is computed and stored. An RBS may also store samples received within the past second and wait for a condition where the RSSI level to drops 6 dB from its highest peak. The RBS may then take the last quarter revolution of the RBS reflector and determine for example, the five samples with the highest RSSI. Averaging the magnetic headings of the five strongest RSSI samples may yield a good estimate of the magnetic heading from the RBS to the analog device.

29.0 RBS Radio Positioning Tags

An RBS Radio Positioning Tag (RBS-Tag) is a radio equipped with an embedded computer designed to detect its own position using an RBS or have its location be detected by an RBS. Applications of the RBS-Tags may involve the RBS tracking the position of the RBS-Tag.

An RBS-Tag may be integrated with an RBS into a camera tripod or gimbal that helps the camera to point in the direction of a person wearing an RBS-Tag. It may also be integrated with a group of network of RBS units making the position of a RBS-Tag available over a TCP/IP network so that mobile devices, such as smartphones, laptops or tablets, may be configured to track down the location of the RBS-Tag.

In an embodiment, an RBS tracks a radio position using similar methods it used to track client devices that are not configured with an RBS client software application. In such implementations, the RBS is not required to ping an RBS-Tag to receive a response. The RBS-Tag may transmit packets at a rate of hundreds or thousands of packets per second using an 802.11 SoC or Bluetooth Low Energy (BLE) SoC radio.

Typically, an RBS-Tag using a typical BLE SoC, such as the Texas Instruments CC2540, may remain awake for 2.7 milliseconds per second to reach 399 days of battery life using a common CR2032 battery. Therefore, the RBS-Tag is usually timed to only transmit when the RBS' PAR 12 is aligned with the RBS-Tag. To facilitate the timing, the RBS may send out a unicast RBS-Alignment Packet addressed to each RBS-Tag when it is in optimal alignment with that RBS-Tag. The RBS-Alignment Packet contains the Magnetic Heading and the rotation speed of the RBS' PAR 12 in Revolutions Per Second (RPS). Once the RBS-Tag completes its transmission arc centered to the optimal alignment of the RBS' PAR 12, the RBS-Tag can go to sleep and time its next wake and packet transmissions to the next optimal alignment of the RBS' PAR 12. Continuous alignment adjustments are made based on each updated RBS-Alignment Packet so that moving RBS-Tags can continually be lined up. The RBS-Tag computes the next wake time from the RBS-Alignment Packet by adding the inverse of RPS to the time of the last RBS-Alignment Packet arrival. The RBS-Tag may optionally skip RBS rotations to conserve more power at the expense of precision and rapid position updates.

If an RBS-Tag is timed to transmit when an RBS reflector is rotating at 360 RPM and aligned within +/−30 degrees, then the RBS-Tag typically remains awaken for 60 degrees or 27.8 milliseconds for every revolution of the RBS. That means that the RBS-Tag may only transmit once for every 10 revolutions of the RBS reflector to achieve 399 days of battery life. Therefore, the RBS-Tag positioning is updated once per 1.67 seconds. If the refresh rate is doubled, and thus the life span of the battery is reduced by half, then the implementation may be suitable for camera tracking applications. If the refresh rate is decreased two fold, and thus the life span of the battery is doubled, then the implementation may be suitable for asset tracking applications.

In a multi RBS mode, two, best placed RBSes may be used to triangulate a location of an RBS-Tag. However, since two RBSes will require two wakes per a RBS-Tag, the life span of the batter may be reduced by half.

If range estimates are necessary, then any of the ranging methods mentioned above may be applicable. An RBS may use a packet flight time in a single RBS mode or a triangulation in a multi RBS mode to find the precise position of the RBS-Tag. In a single RBS mode, the RBS-Tag may lack nanosecond precision clocks so the RBS may need to probe the RBS-Tag and receive a response to obtain a round-trip packet flight time.

30.0 RBS-Tag Wake Packets

Figure 8:
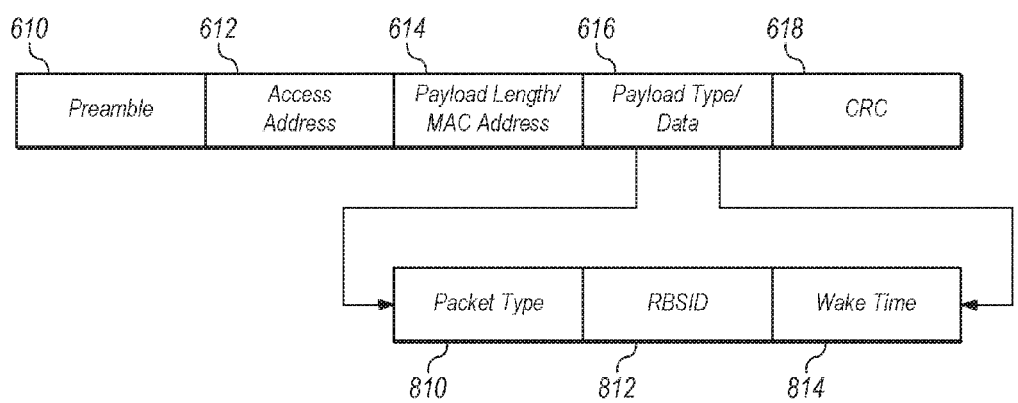
FIG. 8 depicts an exemplary wake packet.

FIG. 8 depicts an exemplary wake packet, which includes a preamble 610, an access address 612, a payload length/MAC address 614, a payload type/data 616, and a CRC 618. Payload type/data 616 may include a packet type 810, an RBSID 812, and a wake time 814.

An RBS operating in either an asymmetric encryption mode or a symmetric encryption mode is configured to wake a stealth RBS-Tags. To issue a wake command, the RBS may transmit for example, 500 wake packets per second. In payload 616, a wake packet may include 8 bits of 11110111 and an 8-bit value that represents the number of minutes during which a stealth RBS-Tag is to remain awaken. Payload 616 may also include a 14-BYTE RBSID.

In an embodiment, an RBS transmits wake packets along with routine key packets in either an asymmetric encryption mode or a symmetric encryption mode.

31.0 Stealth-Tags

In some high value asset tracking applications like the applications for tracking children, laptops, cars, pets, or expensive objects, RBS-Tags are not expected to transmit or broadcast communications constantly. If an RBS-Tag were to transmit communications constantly, a thief or a kidnapper would be able to detect the presence of a radio transmitter in the tag and disable the transmitter. To prevent an RBS-Tag from transmitting, the tag may be configured to operate in a stealth mode, which is a radio silence mode during which the tag refrains from any transmission unless it receives an authorized wake packet from an owner of the RBS-Tag.

In an embodiment, a stealth RBS-Tag is configured to receive and inspect incoming radio signals. If the RBS-Tag receives a wake packet with a matching RBSID, then the RBS-Tag operating in an asymmetric encryption mode may attempt to verify the ECDSA Digital Signature in a key-signature packet. If the RBS-Tag is operating in a symmetric encryption mode, then the tag is configured to receive a wake packet with a matching RBSID and will receive Key-Data-AES Packets. Upon receiving those packets, the tag may attempt to decrypt the packets to verify their authenticity. Once the verification is successful, the Stealth RBS-Tag may switch to a normal RBS-Tag mode so that an authorized RBS may track down the location of the tag. The Stealth RBS-Tag may remain awake for a number of minutes specified in the wake packet.

In an embodiment, to conserve a life span of a battery, a Stealth RBS-Tag may only wake for a 3 millisecond long time period, and once per few seconds to listen for incoming wake packets and a matching RBSID. The RBS-Tag may remain awaken longer if it needs to verify the authenticity of Key-Data or Key-Data-AES Packets. The RBS searching for a stealth RBS-Tag are expected to constantly transmit to wake the stealth RBS-Tag.

32.0 Embedded Stealth-Tags

In an embodiment, a stealth RBS-Tag may be integrated with various devices, affixed to various items and products and attached to for example, expensive pieces of clothing or objects. For example, stealth RBS-Tags may be integrated with electronics devices such as smartphones, tablets, laptops, computers, electronic equipment, consumer electronics devices, and the like, by integrating the tags with the circuit boards and power supplies in the devices. A Stealth RBS-Tag with a small rechargeable Lithium Ion battery may be printed onto an existing circuit board during the manufacturing process using only one square inch and draw power from the board. Even if the host device was powered down, the stealth RBS-Tag may remain operational for scanning initiated and performed by one or more RBSes.

In an embodiment, embedded stealth RBS-Tags are used by retailers as anti-theft devices. Once a retailer sells a product, the retailer may transfer an ownership of a stealth RBS-Tag embedded the product to a customer who purchased the product. After the sale, a retailer may program a stealth RBS-Tag to trust the RBSID that belongs to the customer. From that moment, the customer owns the product with an invisible tracking device.

33.0 Proximity Tags

BLE proximity tags already available on the market may be configured as RBS-Tags or stealth RBS-Tags using software applications configured to encode the stealth RBS-Tag capabilities in the tag. Reconfiguring the tags to stealth RBS-Tags is possible because the already available tags are already configured with SoC hardware.

In an embodiment, an RBS supports proximity tags without any software upgrade. One of the drawback is, that such a proximity tag may operate in a low performance mode. For example, such a proximity tag may often transmit only 1 to 10 packets per second. The RBS may be configured to still determine a magnetic heading and a range, and use a triangulation in a multi-RBS triangulation mode; however, the RBS may take many seconds or even a minute to determine an exact heading to the proximity tag.

34.0 Software-Based Rotating Base Stations

An RBS manufacturer may offer so called, a Software RBS. A Software RBS is a software version of the RBS configured to be executed on a smartphone. A Software RBS shares many of the same features and attributes of a physical RBS device, but it may lack the ability to instantly determine a magnetic heading of a client devices because a smartphone lacks a directional antenna. However, a smartphone may operate as a crude proximity scanner which is useful for finding stealth RBS-Tags.

To operate a Software RBS, a user of a client device may register an RBSID through the RBS manufacturer's website and obtain an X.509 certificate that can be used to verify the packets transmitted by the client device. The Software RBS may operate in a limited capacity without the ability to transmit a magnetic heading in Key-Data, Key-Data-AES, or Intra Packets. The Software RBS may transmit wake packets, and therefore may allow detecting stealth RBS-Tags within a radio proximity.

35.0 Portable Solar Rotating Base Stations

An RBS may be designed as a small and energy efficient panel that operates on a solar power. A small 1 to 2 watt Photovoltaic Solar panel installed on top of a 5-inch diameter RBS with a battery backup may operate indefinitely if located for example, under a window behind the back seat of an automobile. A small solar RBS may be used to search for lost children or animals. The long range characteristics and solar operation means that the solar RBS may also be used as an emergency search and rescue beacon. A solar RBS may also include a 5 volt USB power output so that it can operate as an emergency phone charger.

36.0 RBS Wireless Access Point Mode

In an embodiment, an RBS is configured to operate in a very long range of 802.11 Wireless Access Point. Typically, an 802.11 Access Point with a highly directional antenna is only useful as a fixed Point-to-Point long range wireless bridge. However, because the RBS rotates 360 degrees around a fixed point, the RBS has the long range wireless noise rejection characteristics of a directional antenna, but the full coverage of an omni-directional antenna. An RBS operating in Wireless Access Point Mode is well suited for Point-to-MultiPoint wireless applications. It can act as a central Base Station for a Wireless Internet Service Provider or for Mobile Computing Devices that require a great network performance and range.

To configure 802.11 client devices to be able to use an RBS 802.11 Wireless Access Point, the client device may be configured to support a nonstandard Time Division Multiple Access (TDMA) overlay scheme on top of the normal Carrier Sense Multiple Access (CSMA) scheme used by 802.11. Typically, the TDMA is not officially supported in the 802.11 standard; however, several TDMA implementations of 802.11 exists in open Operating Systems like Linux or other embedded devices. The custom TDMA 802.11 client devices may be configured to time their data transmissions to an aligned RBS much like the RBS-Tags time their wakes and packet transmissions to save a battery life. The RBS may send a unicast RBS-Alignment Packet addressed to a TDMA client device when its PAR 12 is aligned with the client device. The RBS-Alignment Packet may contain a magnetic heading of PAR 12 at time of transmission and may contain the duty-cycle in milliseconds that the client device is allowed to transmit.

An RBS with a large PAR 12 may be configured to boost the signal levels of received and transmitted signals by 24 dBm while attenuating noise from every direction not aligned with PAR 12. The large boost in the signal and signal-to-noise (SNR) ratio may result in a 45-fold boost in data transmission rates. Another benefit to the TDMA scheduled access scheme is that client devices may unlikely cause packet collisions. Fewer collisions greatly improve real-time performance of voice and video applications. The added range, low radio noise, and superior packet collision avoidance makes the RBS a robust 802.11 Wireless Access Point.

The processes described above may be performed by hardware or software. If the process is performed by software, the software may reside in software memory included in Memory Storage Module in the mobile unit or cellular network server. The software stored in software memory may include an ordered list of executable instructions for implementing logical functions (i.e., "logic" that may be implemented either in digital form, such as digital circuitry or source code, or in analog form, such as analog circuitry or an analog source such as an analog, electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples: "a non-exhaustive list" of the computer-readable medium would include the following: an electrical connection ("electronic") having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The preferred embodiments may be implemented as a method, system or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present approach, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present approach. Moreover, steps may be added to the above described logic and still conform to implementations of the approach.

Further, with respect to the claims, it should be understood that any of the claims described below may be combined for the purposes of the present approach.

The foregoing embodiments and advantages are merely exemplary and are not to be construed as limiting the present approach. The present teaching can be readily applied to other types of systems. The description of the present approach is intended to be illustrative, and not to limit the scope of the claims. Many alternatives, modifications, and variations will be apparent to those skilled in the art.

Accordingly, the claimed approach is not limited to the precise embodiments described in detail herein above. While various embodiments of the approach have been described, it will be apparent to those of ordinary skill in the art that many more embodiments and implementations are possible that are within the scope of this approach.

37.0 Implementation Mechanisms—Hardware Overview

According to one embodiment, the techniques described herein are implemented by one or more special-purpose computer devices. The special-purpose computer devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computer devices may also combine custom hard-wired logic, ASICs, or FPGAs with custom programming to accomplish the techniques. The special-purpose computer devices may be desktop computer systems, portable computer systems, handheld devices, networking devices or any other device that incorporates hard-wired and/or program logic to implement the techniques.

Figure 9:
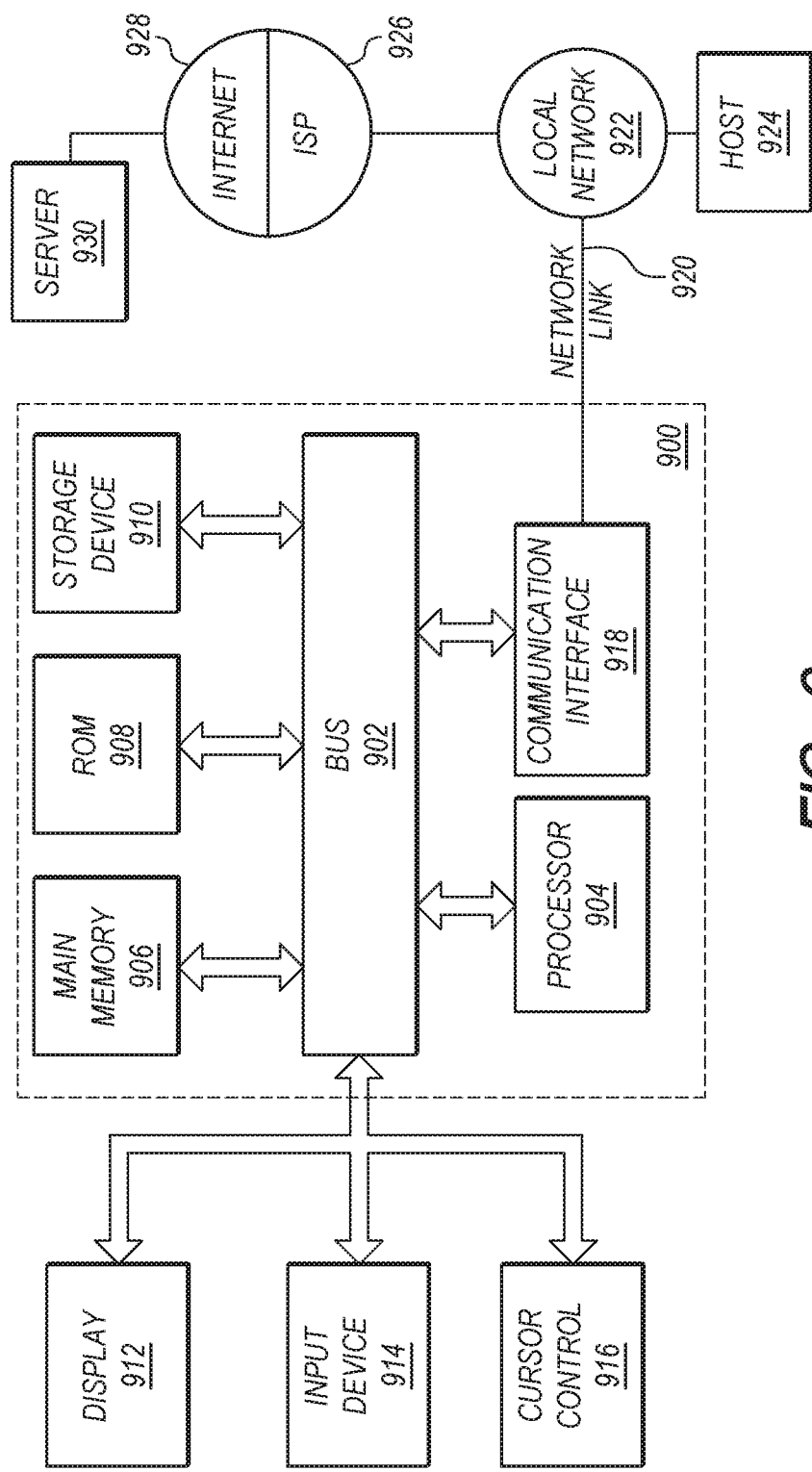
FIG. 9 is a block diagram that illustrates a computer system upon which some embodiments may be implemented.

For example, FIG. 9 is a block diagram that illustrates a computer system upon which some embodiments may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main-memory 906, such as a random access memory (RAM) or other dynamic storage device, coupled to bus 902 for storing information and instructions to be executed by processor 904. Main-memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main-memory 906. Such instructions may be read into main-memory 906 from another storage medium, such as storage device 910. Execution of the sequences of instructions contained in main-memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main-memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main-memory 906, from which processor 904 retrieves and executes the instructions. The instructions received by main-memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server computer 930 might transmit a requested code for an application program through Internet 928, ISP 926, local network 922 and communication interface 918.

The received code may be executed by processor 904 as it is received, and/or stored in storage device 910, or other non-volatile storage for later execution.

38.0 Other Aspects of Disclosure

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

What is claimed is:

1. A data transferring system comprising:
a base station computer, comprising a rotatable reflector, a circular polarization antenna, a magnet, a hall sensor, and a transceiver, the data transferring system configured to perform:
generating and continuously unicasting an updated alignment packet to one or more tag computers to facilitate a battery conservation in the one or more tag computers;
wherein the updated alignment packet comprises a relative heading of the rotatable reflector when the rotatable reflector is at a peak alignment and a peak signal for a particular tag computer, and a rotation speed of the rotatable reflector measured in revolutions-per-second (RPS);
as the rotatable reflector continuously rotates around the circular polarization antenna, which remains static when the rotatable reflector rotates:
the circular polarization antenna periodically transmitting a plurality of base wireless communications received from the transceiver;
receiving a plurality of tag transmission wireless communications from a plurality of antennas positioned in any possible orientation;
wherein the plurality of tag transmission wireless communications comprises one or more tag transmission wireless communications from a particular antenna, of the plurality of antennas positioned in any possible orientation;
wherein the particular antenna is part of a particular tag computer, from the one or more tag computers;
in response to receiving the one or more tag transmission wireless communications from the particular tag computer:
for each tag transmission wireless communication, of the one or more tag transmission wireless communications,
computing a signal strength value for the tag transmission wireless communication;
based on, at least in part, the signal strength value, determining a tag heading of the particular tag computer;
wherein the tag heading indicates a relative location of the particular tag computer with respect to the base station computer; and
wherein the tag heading is determined as a product of:
a time-since-hall value, which corresponds to a time period elapsing since the last time the hall sensor was triggered by the magnet;
a revolution-per-second value, which corresponds to an inverse of a difference between the last time the hall sensor was triggered by the magnet and a previous hall trigger time; and
a constant value.

2. The data transferring system of claim 1,
wherein the base station computer operates as timed and aligned with one or more other base station computers;
wherein the base station computer further comprises a cable that is communicatively coupled to the circular polarization antenna;
wherein the circular polarization antenna and the cable remain stationary when the rotatable reflector rotates around the circular polarization antenna; and
wherein the rotatable reflector is a parabolic reflector that directs a transmission of the plurality of base wireless communications toward an aperture in the rotatable reflector as the rotatable reflector rotates around the circular polarization antenna.

3. The data transferring system of claim 2,
wherein the base station computer further comprises a magnetic sensor configured to determine a base magnetic heading of the base station computer.

4. The data transferring system of claim 3, wherein the base station computer is further configured to perform:
determining the tag heading of the particular tag computer based on, at least in part, the signal strength value, and the base magnetic heading of the base station computer.

5. The data transferring system of claim 4, wherein the base station computer is further configured to perform:
as the rotatable reflector rotates around the circular polarization antenna which remains static when the rotatable reflector rotates, periodically receiving a plurality of tag wireless communications from the particular tag computer;
in response to receiving the plurality of tag wireless communications, generating a plurality of base response wireless communications and broadcasting the plurality of base response wireless communications;
wherein the broadcasting of the plurality of base response wireless communications causes the particular tag computer to:
receive one or more responses, from the plurality of base response wireless communications; and
in response to receiving the one or more responses, from the plurality of base response wireless communications, determine the relative location of the particular tag computer with respect to the base station computer.

6. The data transferring system of claim 5,
wherein a base wireless communication, from the plurality of base wireless communications transmitted from the transceiver, comprises an identifier of the base station computer;
wherein the identifier of the base station computer is one or more of: a MAC address of the base station computer, or a customized identifier configured on the base station computer.

7. The data transferring system of claim 6,
wherein communications broadcast from the base station computer and communications broadcast from the one or more tag computers are encrypted.

8. The data transferring system of claim 7, further comprising one or more additional base station computers, each of which is configured to broadcast base wireless communications to the one or more tag computers, each of which is configured to receive tag wireless communications from the one or more tag computers, and each of which is configured to determine headings of one or more of the one or more tag computers.

9. A method for transferring data within a data transferring system, the method performed by a base station computer, comprising a rotatable reflector, a circular polarization antenna, a magnet, a hall sensor, and a transceiver, the method comprising:
generating and continuously unicasting an updated alignment packet to one or more tag computers to facilitate a battery conservation in the one or more tag computers;
wherein the updated alignment packet comprises a relative heading of the rotatable reflector when the rotatable reflector is at a peak alignment and a peak signal for a particular tag computer, and a rotation speed of the rotatable reflector measured in revolutions-per-second (RPS);
as the rotatable reflector continuously rotates around the circular polarization antenna, which remains static when the rotatable reflector rotates:
the circular polarization antenna periodically transmitting a plurality of base wireless communications received from the transceiver;
receiving a plurality of tag transmission wireless communications from a plurality of antennas positioned in any possible orientation;
wherein the plurality of tag transmission wireless communications comprises one or more tag transmission wireless communications from a particular antenna, of the plurality of antennas positioned in any possible orientation;
wherein the particular antenna is part of a particular tag computer, from the one or more tag computers;
in response to receiving the one or more tag transmission wireless communications from the particular tag computer:
for each tag transmission wireless communication, of the one or more tag transmission wireless communications,
computing a signal strength value for the tag transmission wireless communication;
based on, at least in part, the signal strength value, determining a tag heading of the particular tag computer;
wherein the tag heading indicates a relative location of the particular tag computer with respect to the base station computer; and
wherein the tag heading is determined as a product of:
a time-since-hall value, which corresponds to a time period elapsing since the last time the hall sensor was triggered by the magnet;
a revolution-per-second value, which corresponds to an inverse of a difference between the last time the hall sensor was triggered by the magnet and a previous hall trigger time; and
a constant value.

10. The method of claim 9,
wherein the base station computer operates as timed and aligned with one or more other base station computers;
wherein the base station computer further comprises a cable that is communicatively coupled to the circular polarization antenna;
wherein the circular polarization antenna and the cable remain stationary when the rotatable reflector rotates around the circular polarization antenna; and
wherein the rotatable reflector is a parabolic reflector that directs a transmission of the plurality of base wireless communications toward an aperture in the rotatable reflector as the rotatable reflector rotates around the circular polarization antenna.

11. The method of claim 10,
wherein the base station computer further comprises a magnetic sensor configured to determine a base magnetic heading of the base station computer.

12. The method of claim 11, further comprising:
determining the tag heading of the particular tag computer based on, at least in part, the signal strength value, and the base magnetic heading of the base station computer.

13. The method of claim 12, further comprising:
as the rotatable reflector rotates around the circular polarization antenna which remains static when the rotatable reflector rotates, periodically receiving a plurality of tag wireless communications from the particular tag computer;
in response to receiving the plurality of tag wireless communications, generating a plurality of base response wireless communications and broadcasting the plurality of base response wireless communications;
wherein the broadcasting of the plurality of base response wireless communications causes the particular tag computer to:
receive one or more responses, from the plurality of base response wireless communications; and
in response to receiving the one or more responses, from the plurality of base response wireless communications, determining the relative location of the particular tag computer with respect to the base station computer.

14. The method of claim 13,
wherein a base wireless communication, from the plurality of base wireless communications, comprises an identifier of the base station computer;
wherein the identifier of the base station computer is one or more of: a MAC address of the base station computer, or a customized identifier configured on the base station computer.

15. The method of claim 14,
wherein communications broadcast from the base station computer and communications broadcast from the one or more tag computers are encrypted.

16. The method of claim 15, further comprising:
broadcasting, from each of a plurality of base stations, base wireless communications to the one or more tag computers;
receiving, at each of the plurality of base stations, tag wireless communications from the one or more tag computers; and
determining, by each of the plurality of base stations, headings of one or more of the one or more tag computers.

17. A non-transitory computer-readable storage medium, storing one or more instructions which, when executed by one or more processors, cause the one or more processors to perform:
  generating and continuously unicasting an updated alignment packet to one or more tag computers to facilitate a battery conservation in the one or more tag computers;
  wherein the updated alignment packet comprises a relative heading of a rotatable reflector when the rotatable reflector is at a peak alignment and a peak signal for a particular tag computer, and a rotation speed of the rotatable reflector measured in revolutions-per-second (RPS);
  as a rotatable reflector continuously rotates around a circular polarization antenna which remains static when the rotatable reflector rotates:
    the circular polarization antenna periodically transmitting a plurality of base wireless communications received from a transceiver;
    receiving a plurality of tag transmission wireless communications from a plurality of antennas positioned in any possible orientation;
    wherein the plurality of tag transmission wireless communications comprises one or more tag transmission wireless communications from a particular antenna, of the plurality of antennas positioned in any possible orientation;
    wherein the particular antenna is part of a particular tag computer, from the one or more tag computers;
    in response to receiving the one or more tag transmission wireless communications from the particular tag computer:
      for each tag transmission wireless communication, of the one or more tag transmission wireless communications,
        computing a signal strength value for the tag transmission wireless communication;
        based on, at least in part, the signal strength value, determining a tag heading of the particular tag computer;
        wherein the tag heading indicates a relative location of the particular tag computer with respect to a base station computer; and
        wherein the tag heading is determined as a product of:
          a time-since-hall value, which corresponds to a time period elapsing since the last time a hall sensor was triggered by a magnet;
          a revolution-per-second value, which corresponds to an inverse of a difference between the last time the hall sensor was triggered by the magnet and a previous hall trigger time; and
          a constant value.

18. The non-transitory computer-readable storage medium of claim 17, wherein the base station computer operates as timed and aligned with one or more other base station computers;
wherein the base station computer further comprises a cable that is communicatively coupled to the circular polarization antenna;
wherein the circular polarization antenna and the cable remain stationary when the rotatable reflector rotates around the circular polarization antenna; and
wherein the rotatable reflector is a parabolic reflector that directs a transmission of the plurality of base wireless communications toward an aperture in the rotatable reflector as the rotatable reflector rotates around the circular polarization antenna.

19. The non-transitory computer-readable storage medium of claim 18,
wherein the base station computer further comprises a magnetic sensor configured to determine a base magnetic heading of the base station computer.

20. The non-transitory computer-readable storage medium of claim 19, storing additional instructions which, when executed by the one or more processors, cause the one or more processors to perform:
determining the tag heading of the particular tag computer based on, at least in part, the signal strength value, and the base magnetic heading of the base station computer.

* * * * *